(12) United States Patent
Ng et al.

(10) Patent No.: US 10,959,197 B2
(45) Date of Patent: Mar. 23, 2021

(54) CELL DETECTION, SYNCHRONIZATION AND MEASUREMENT ON UNLICENSED SPECTRUM

(71) Applicant: Samsung Electronics Co., Ltd., Suwon-si (KR)

(72) Inventors: Boon Loong Ng, Plano, TX (US); Aris Papasakellariou, Houston, TX (US); Thomas David Novlan, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 518 days.

(21) Appl. No.: 14/846,598

(22) Filed: Sep. 4, 2015

(65) Prior Publication Data

US 2016/0073366 A1   Mar. 10, 2016

Related U.S. Application Data

(60) Provisional application No. 62/047,502, filed on Sep. 8, 2014, provisional application No. 62/053,622, filed
(Continued)

(51) Int. Cl.
*H04W 56/00* (2009.01)
*H04W 48/12* (2009.01)
(Continued)

(52) U.S. Cl.
CPC ......... *H04W 56/001* (2013.01); *H04L 5/0048* (2013.01); *H04W 16/14* (2013.01);
(Continued)

(58) Field of Classification Search
CPC ........ H04L 5/00; H04W 24/10; H04W 48/12; H04W 56/001
(Continued)

(56) References Cited

U.S. PATENT DOCUMENTS

2013/0336156 A1   12/2013   Wei et al.
2014/0036853 A1   2/2014   Kim et al.
(Continued)

FOREIGN PATENT DOCUMENTS

EP       3185633 A1        6/2017
KR    20140095994 A        8/2014
WO    2014-112595 A1       1/2017

OTHER PUBLICATIONS

LG Electronics, "DRS-Based Measurement Procedures With Network Assistance", 3GPP TSG RAN WG1 Meeting #78, R1-143170, Dresden, Germany, Aug. 10, 2014, 7 pgs.
(Continued)

*Primary Examiner* — Omar J Ghowrwal
*Assistant Examiner* — Kokou R Detse

(57) ABSTRACT

Methods and apparatuses for cell detection, synchronization and measurement on unlicensed spectrum. A method for receiving a discovery reference signal (DRS) includes identifying, based on a DRS measurement timing configuration (DMTC), a DRS detection/measurement gap duration and a periodicity; and listening for the DRS on a carrier in an unlicensed spectrum during the identified gap duration at the identified periodicity. An apparatus for an eNodeB associated with a cell includes a controller and a transceiver. The controller is configured to configure a DMTC including a DRS detection/measurement gap duration and periodicity. The transceiver is configured to transmit the DRS on a carrier in an unlicensed spectrum during the gap duration at the periodicity.

15 Claims, 19 Drawing Sheets

Related U.S. Application Data on Sep. 22, 2014, provisional application No. 62/092,126, filed on Dec. 15, 2014, provisional application No. 62/189,122, filed on Jul. 6, 2015, provisional application No. 62/190,582, filed on Jul. 9, 2015.

(51) Int. Cl.
  *H04W 24/10* (2009.01)
  *H04L 5/00* (2006.01)
  *H04W 16/14* (2009.01)
  *H04L 27/00* (2006.01)
(52) U.S. Cl.
  CPC ........... *H04W 24/10* (2013.01); *H04W 48/12* (2013.01); *H04L 5/001* (2013.01); *H04L 27/0006* (2013.01)
(58) Field of Classification Search
  USPC .......................................................... 370/329
  See application file for complete search history.

(56) References Cited

U.S. PATENT DOCUMENTS

| | | | |
|---|---|---|---|
| 2014/0036881 | A1 | 2/2014 | Kim et al. |
| 2014/0112289 | A1 | 4/2014 | Kim et al. |
| 2015/0110066 | A1* | 4/2015 | Gaal ................. H04W 72/0453 370/330 |
| 2015/0358899 | A1 | 12/2015 | Ko et al. |
| 2015/0365868 | A1 | 12/2015 | Chang et al. |
| 2016/0057784 | A1* | 2/2016 | You ....................... H04W 88/04 370/329 |
| 2016/0100404 | A1* | 4/2016 | Han .......................... H04L 5/00 370/329 |
| 2016/0227571 | A1 | 8/2016 | Baek et al. |
| 2016/0234762 | A1* | 8/2016 | You ....................... H04J 11/0056 |
| 2016/0301502 | A1* | 10/2016 | Cheng ................... H04L 5/0094 |
| 2017/0070312 | A1* | 3/2017 | Yi ......................... H04J 11/0036 |

OTHER PUBLICATIONS

ETRI, "DRS Based RRM Measurement and Network Assistance Information", 3GPP TSG RAN WG1 Meeting #78, R1-143046, Dresden, Germany, Aug. 10, 2014, 11 pgs.
International Search Report and Written Opinion issued for PCT/KR2015/009459 dated Feb. 4, 2016, 11 pgs.
3GPP TS 36.133, "3rd Generation Partnership Project; Technical Specification Group Radio Access Network; Evolved Universal Terrestrial Radio Access (E-UTRA); Requirements for support of radio resource management", (Release 12), V12.7.0 (Mar. 2015), 33 pages.
3GPP TS 36.133, "3rd Generation Partnership Project; Technical Specification Group Radio Access Network; Evolved Universal Terrestrial Radio Access (E-UTRA); Requirements for support of radio resource management", (Release 12), V12.7.0 (Mar. 2015), 225 pages.
3GPP TS 36.133, "3rd Generation Partnership Project; Technical Specification Group Radio Access Network; Evolved Universal Terrestrial Radio Access (E-UTRA); Requirements for support of radio resource management", (Release 12), V12.7.0 (Mar. 2015), 209 pages.
3GPP TS 36.133, "3rd Generation Partnership Project; Technical Specification Group Radio Access Network; Evolved Universal Terrestrial Radio Access (E-UTRA); Requirements for support of radio resource management", (Release 12), V12.7.0 (Mar. 2015), 348 pages.
3GPP TS 36.133, "3rd Generation Partnership Project; Technical Specification Group Radio Access Network; Evolved Universal Terrestrial Radio Access (E-Utra); Requirements for support of radio resource management", (Release 12), V12.7.0 (Mar. 2015), 199 pages.
3GPP TS 36.211, "3rd Generation Partnership Project; Technical Specification Group Radio Access Network; Evolved Universal Terrestrial Radio Access (E-UTRA); Physical channels and modulation", (Release 12), V12.2.0 (Jun. 2014), 121 pages.
3GPP TS 36.212, "3rd Generation Partnership Project; Technical Specification Group Radio Access Network; Evolved Universal Terrestrial Radio Access (E-UTRA); Multiplexing and channel coding", (Release 12), V12.2.0 (Sep. 2014), 89 pages.
3GPP TS 36.213, "3rd Generation Partnership Project; Technical Specification Group Radio Access Network; Evolved Universal Terrestrial Radio Access (E-UTRA); Physical layer procedures", (Release 12), V12.2.0 (Jun. 2014), 207 pages.
3GPP TS 36.331, "3rd Generation Partnership Project; Technical Specification Group Radio Access Network; Evolved Universal Terrestrial Radio Access (E-UTRA); Radio Resource Control (RRC); Protocol specification", (Release 12), V12.2.0 (Jun. 2014), 365 pages.
3GPP TS 36.872, "3rd Generation Partnership Project; Technical Specification Group Radio Access Network; Small cell enhancements for E-UTRA and E-UTRAN—Physical layer aspects", Technical Report, (Release 12), V12.0.0 (Sep. 2013), 78 pages.
ETSI EN 301 893, "Broadband Radio Access Networks (BRAN); 5 GHz high performance RLAN; Harmonized EN covering the essential requirements of article 3.2 of the R&TTE Directive", V1.7.1 (Jun. 2012), 90 pages.
Communication dated Aug. 25, 2017 in connection with European Patent Application No. 15839804.0.
Intel Corporation, "Details on small cell discovery signal", 3GPP TSG-RAN WG1 #77, May 19-23, 2014, 6 pages.
Communication for a foreign patent office in a counterpart foreign application, "Notice of Preliminary Rejection," Japanese Patent Application No. JP 2017-533151, dated Apr. 9, 2018, 8 pages.
TSG RAN WG1, "LS on agreements on small cell discovery," R1-143610, 3GPP TSG RAN WG1 Meeting #78, Dresden, Germany, Aug. 18-22, 2014, 3 pages.
Coolpad, "Discussion on DL reference signal transmission for LAA," R1-153306, 3GPP TSG RAN WG1 Meeting #81, Fukuoka, Japan, May 25-29, 2015, 3 pages.
NTT Docomo, Inc., "Views on RRM measurement and corresponding DRS design for LAA," R1-153180, 3GPP TS RAN WG1 Meeting #81, Fukuoka, Japan, May 25-29, 2015, 4 pages.
Samsung, "Discussion on solutions for required functionalities and design targets for LAA," R1-143879, 3GPP TSG RAN WG1 #78bis, Ljubljana, Slovenia, Oct. 6-10, 2014, 3 pages.
Samsung, "Discussion on LAA DRS design," R1-152866, 3GPP TSG RAN WG1 Meeting #81, Fukuoka, Japan, May 25-29, 2015, 8 pages.
Intellectual Property India, Examination Report regarding Indian Application No. 201737012420, dated Jan. 28, 2020, 6 pages.
China National Intellectual Property Administration, "The First Office Action," Application No. CN201580048251.X, dated Jun. 26, 2019, 20 pages.
European Patent Office, "Communication pursuant to Article 94(3) EPC," Application No. EP15839804.0, dated May 3, 2019, 7 pages.
Communication pursuant to Article 94(3) EPC in connection with European Application No. 15839804.0 dated May 25, 2020, 8 pages.
European Patent Office Communication pursuant to Article 94(3) EPC, dated Nov. 6, 2020 regarding Application No. 15839804.0, 6 pages.

* cited by examiner

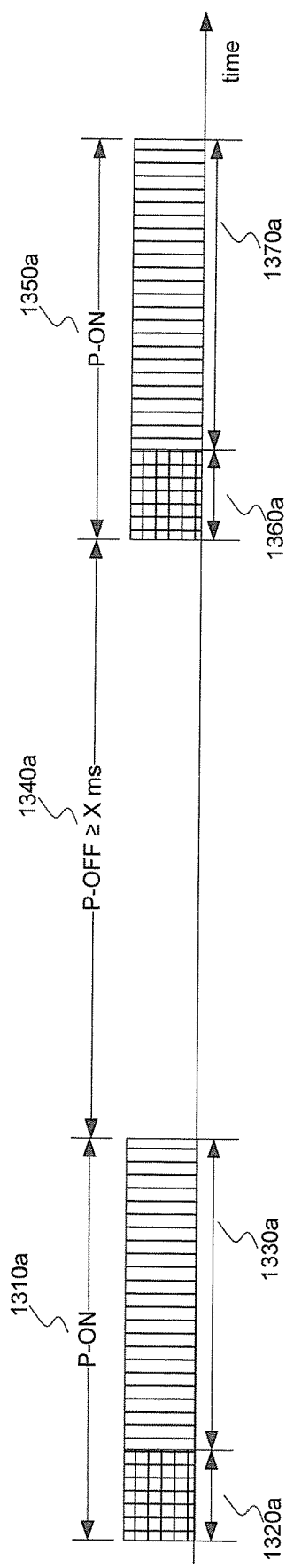
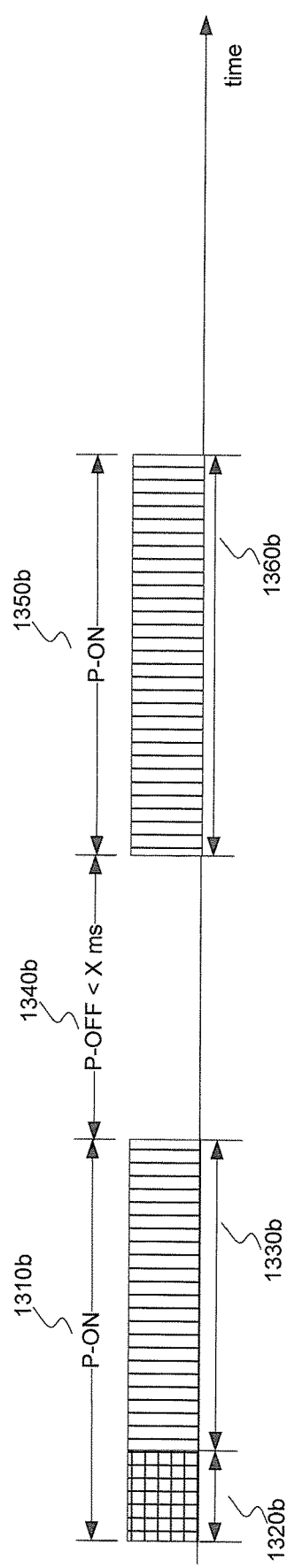
FIG. 13A
FIG. 13B

CELL DETECTION, SYNCHRONIZATION AND MEASUREMENT ON UNLICENSED SPECTRUM

CROSS-REFERENCE TO RELATED APPLICATION(S) AND CLAIM OF PRIORITY

The present application claims priority to U.S. Provisional Patent Application Ser. No. 62/047,502 filed Sep. 8, 2014, entitled "METHODS AND APPARATUS OF LTE CELL DETECTION, SYNCHRONIZATION AND MEASUREMENT ON UNLICENSED SPECTRUM," U.S. Provisional Patent Application Ser. No. 62/053,622 filed Sep. 22, 2014, entitled "METHODS AND APPARATUS OF LTE CELL DETECTION, SYNCHRONIZATION AND MEASUREMENT ON UNLICENSED SPECTRUM," U.S. Provisional Patent Application Ser. No. 62/092,126 filed Dec. 15, 2014, entitled "METHODS AND APPARATUS OF LTE CELL DETECTION, SYNCHRONIZATION AND MEASUREMENT ON UNLICENSED SPECTRUM," U.S. Provisional Patent Application Ser. No. 62/189,122 filed Jul. 6, 2015, entitled "METHODS AND APPARATUS OF LTE CELL DETECTION, SYNCHRONIZATION AND MEASUREMENT ON UNLICENSED SPECTRUM," and U.S. Provisional Patent Application Ser. No. 62/190,582 filed Jul. 9, 2015, entitled "METHODS AND APPARATUS OF LTE CELL DETECTION, SYNCHRONIZATION AND MEASUREMENT ON UNLICENSED SPECTRUM." The content of the above-identified patent document is incorporated herein by reference.

TECHNICAL FIELD

This disclosure relates generally to wireless communication on unlicensed spectrum. More specifically, this disclosure relates to cell detection, synchronization and measurement on unlicensed spectrum.

BACKGROUND

Licensed Assisted Access (LAA) refers to Long Term Evolution (LTE) radio access technology (RAT) on an unlicensed frequency spectrum (e.g., 5 GHz). For Release (Rel)-13 of LTE, LAA cells/carriers are being planned to be used as a secondary cell (SCell) for carrier aggregation (CA). To co-exist with Wi-Fi uses of 5 Ghz spectrum, certain requirements may be imposed on LAA. For example, a listen-before-talk protocol may be required to identify whether the channel is clear before using the channel (e.g., a clear channel assessment (CCA)). Additionally, a transmissions may be required to be discontinuous and have a limited max transmission duration (e.g., 4 ms in Japan, 10 or 13 ms in Europe, etc.).

SUMMARY

Embodiments of the present disclosure provide methods and apparatuses for cell detection, synchronization and measurement on unlicensed spectrum.

In one embodiment, a method for receiving a discovery reference signal (DRS) is provided. The method includes identifying, based on a DRS measurement timing configuration (DMTC), a DRS detection/measurement gap duration and a periodicity; and listening for the DRS on a carrier in an unlicensed spectrum during the identified gap duration at the identified periodicity.

In another embodiment, a user equipment (UE) for receiving a DRS is provided. The apparatus includes a controller and a transceiver. The controller is configured to identify, based on a DMTC, a DRS detection/measurement gap duration and periodicity. The transceiver is configured to listen for the DRS on a carrier in an unlicensed spectrum during the identified gap duration at the identified periodicity.

In yet another embodiment, an apparatus for an eNodeB associated with a cell is provided. The apparatus includes a controller and a transceiver. The controller is configured to configure a DMTC including a DRS detection/measurement gap duration and periodicity. The transceiver is configured to transmit the DRS on a carrier in an unlicensed spectrum during the gap duration at the periodicity.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 13A and 13B illustrate example LAA/LTE-U carriers with DRS occasion transmission depending on the time difference between of the end of the previous P-ON instance and the start of the current P-ON instance in accordance with various embodiments of the present disclosure;

DETAILED DESCRIPTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein:

3GPP TS 36.211 v12.2.0, "E-UTRA, Physical channels and modulation;"
3GPP TS 36.212 v12.2.0, "E-UTRA, Multiplexing and Channel coding;"
3GPP TS 36.213 v12.2.0, "E-UTRA, Physical Layer Procedures;"
3GPP TR 36.872 V12.0.0, "Small cell enhancements for E-UTRA and E-UTRAN—Physical layer aspects;"

3GPP TS 36.133 v12.7.0, "E-UTRA Requirements for support of radio resource management;"

3GPP TS 36.331 v12.2.0, "E-UTRA, Radio Resource Control (RRC) Protocol Specification;"

ETSI EN 301 893 V1.7.1 (2012-06), Harmonized European Standard, "Broadband Radio Access Networks (BRAN); 5 GHz high performance RLAN;" and U.S. Provisional Applications 62/074,54; 62/086,018; 62/092,120; 62/131,687; and 62/134,386 each entitled "Methods and apparatus for channel access for LTE on unlicensed spectrum" and filed Nov. 3, 2014, Dec. 1, 2014, Dec. 15, 2014, Mar. 11, 2015, and Mar. 17, 2015, respectively.

FIGS. 1-3B below describe various embodiments implemented in wireless communications systems and with the use of OFDM or OFDMA communication techniques. The description of FIGS. 1-3B is not meant to imply physical or architectural limitations to the manner in which different embodiments may be implemented. Different embodiments of the present disclosure may be implemented in any suitably-arranged communications system.

Figure 1:
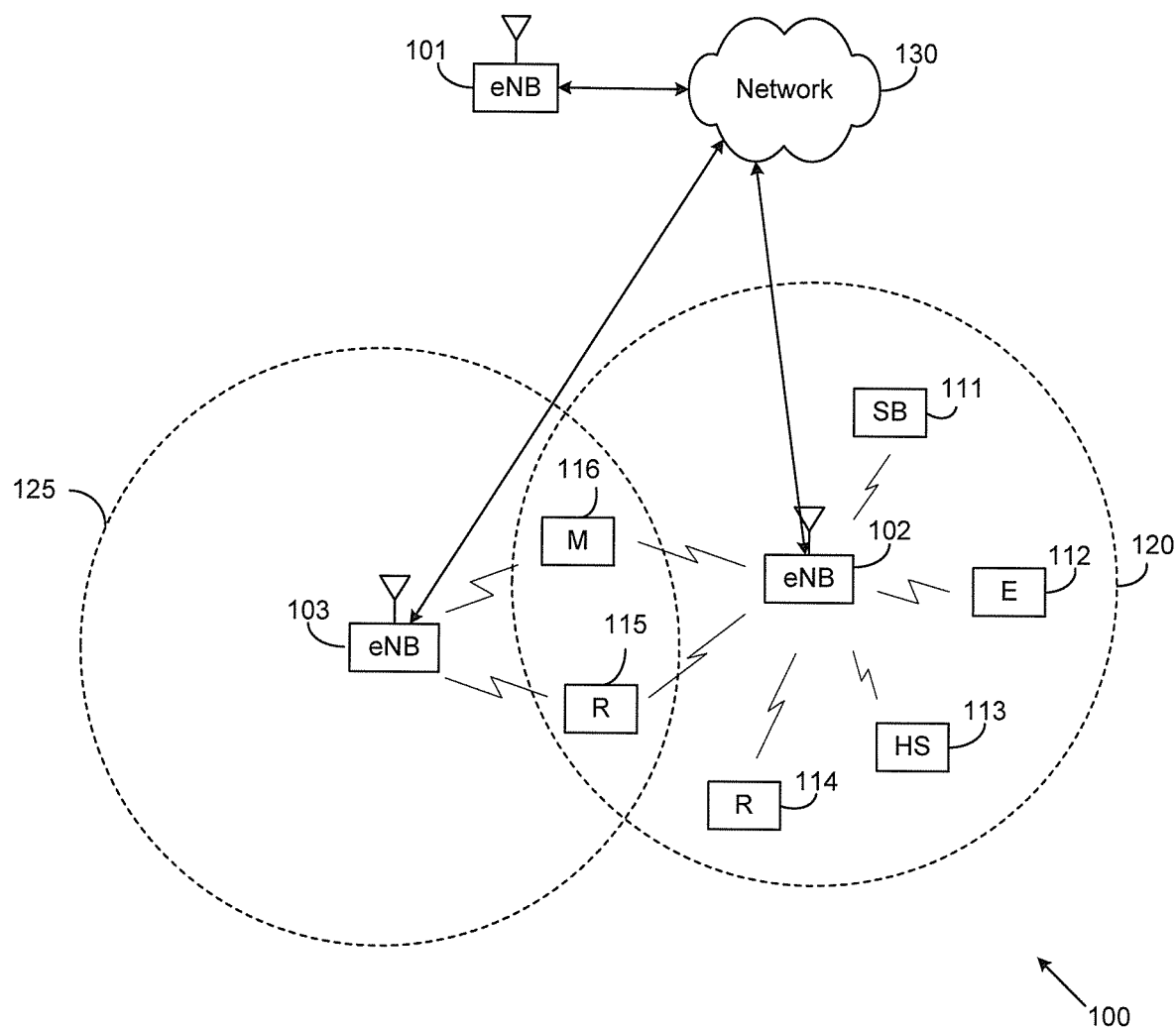
FIG. 1 illustrates an example wireless network according to illustrative embodiments of the present disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs may include circuitry and/or programming for cell detection, synchronization and measurement on unlicensed spectrum, and one or more of the eNBs may include circuitry and/or programming for configuring transmissions on unlicensed spectrum. Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

Figure 2A:
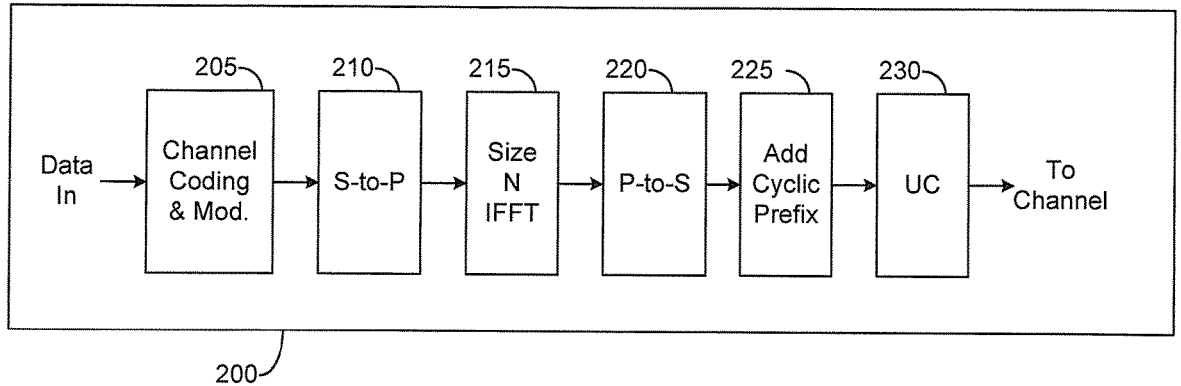
FIG. 2A illustrates a high-level diagram of an orthogonal frequency division multiple access transmit path according to illustrative embodiments of this disclosure.
Figure 2B:
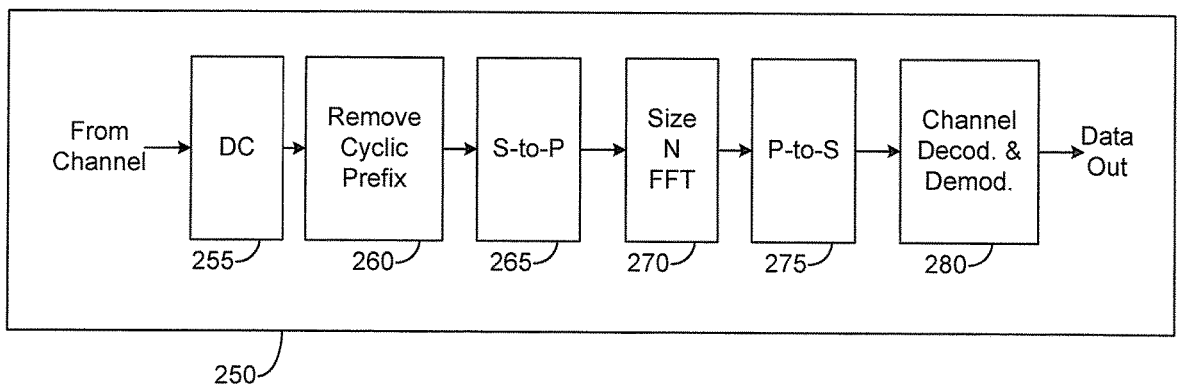
FIG. 2B illustrates a high-level diagram of an orthogonal frequency division multiple access receive path according to illustrative embodiments of this disclosure.

FIG. 2A is a high-level diagram of transmit path circuitry 200. For example, the transmit path circuitry 200 may be used for an orthogonal frequency division multiple access (OFDMA) communication. FIG. 2B is a high-level diagram of receive path circuitry 250. For example, the receive path circuitry 250 may be used for an orthogonal frequency division multiple access (OFDMA) communication. In FIGS. 2A and 2B, for downlink (DL) communication, the transmit path circuitry 200 may be implemented in a base station (eNB) 102 or a relay station, and the receive path circuitry 250 may be implemented in a user equipment (e.g., user equipment 116 of FIG. 1). In other examples, for uplink (UL) communication, the receive path circuitry 250 may be implemented in a base station (e.g., eNB 102 of FIG. 1) or a relay station, and the transmit path circuitry 200 may be implemented in a user equipment (e.g., user equipment 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2A and 2B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 2, etc.), while for FFT and IFFT functions, the value of the N variable may be any integer number that is a power of two (i.e., 1, 2, 2, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Figure 3A:
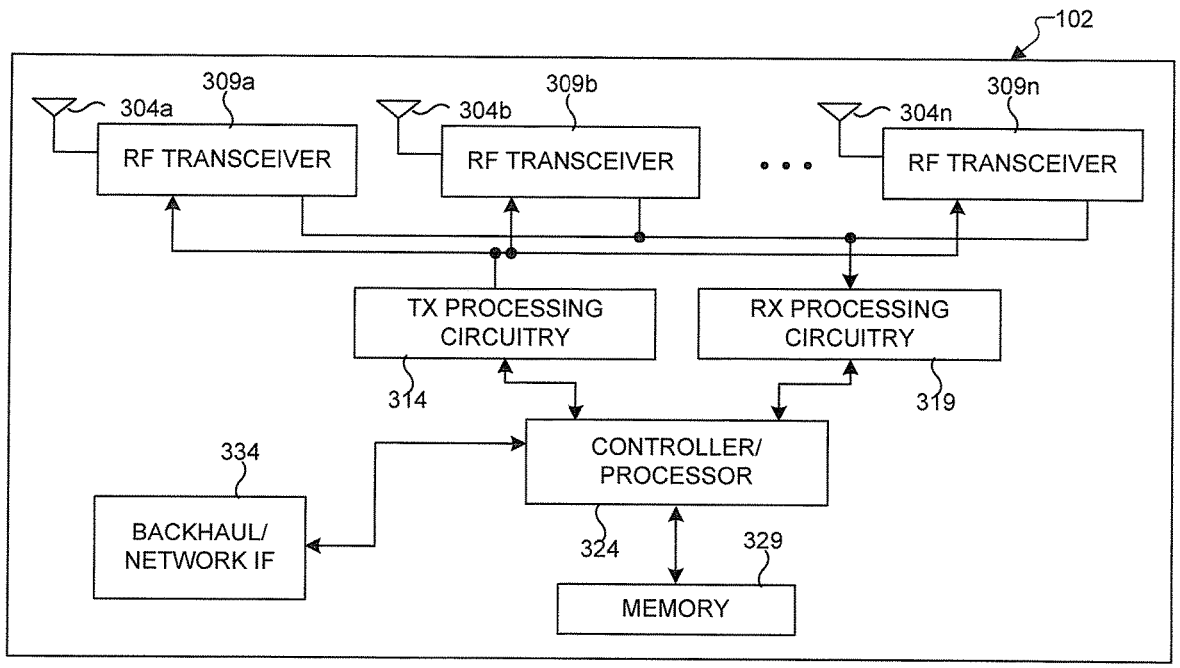
FIG. 3A illustrates an example eNB according to illustrative embodiments of the present disclosure.

FIG. 3A illustrates an example eNB 102 according to this disclosure. The embodiment of the eNB 102 illustrated in FIG. 3A is for illustration only, and the eNBs 101 and 103 of FIG. 1 could have the same or similar configuration. However, eNBs come in a wide variety of configurations, and FIG. 3A does not limit the scope of this disclosure to any particular implementation of an eNB.

As shown in FIG. 3A, the eNB 102 includes multiple antennas 304a-304n, multiple RF transceivers 309a-309n, transmit (TX) processing circuitry 314, and receive (RX) processing circuitry 319. The eNB 102 also includes a controller/processor 324, a memory 329, and a backhaul or network interface 334.

The RF transceivers 309a-309n receive, from the antennas 304a-304n, incoming RF signals, such as signals transmitted by UEs in the network 100. The RF transceivers 309a-309n down-convert the incoming RF signals to generate IF or baseband signals. The IF or baseband signals are sent to the RX processing circuitry 319, which generates processed baseband signals by filtering, decoding, and/or digitizing the baseband or IF signals. The RX processing circuitry 319 transmits the processed baseband signals to the controller/processor 324 for further processing.

The TX processing circuitry 314 receives analog or digital data (such as voice data, web data, e-mail, or interactive video game data) from the controller/processor 324. The TX processing circuitry 314 encodes, multiplexes, and/or digitizes the outgoing baseband data to generate processed baseband or IF signals. The RF transceivers 309a-309n receive the outgoing processed baseband or IF signals from the TX processing circuitry 314 and up-converts the baseband or IF signals to RF signals that are transmitted via the antennas 304a-304n.

The controller/processor 324 can include one or more processors or other processing devices that control the overall operation of the eNB 102. For example, the controller/processor 324 could control the reception of forward channel signals and the transmission of reverse channel signals by the RF transceivers 309a-309n, the RX processing circuitry 319, and the TX processing circuitry 314 in accordance with well-known principles. The controller/processor 324 could support additional functions as well, such as more advanced wireless communication functions. For instance, the controller/processor 324 could support beam forming or directional routing operations in which outgoing signals from multiple antennas 304a-304n are weighted differently to effectively steer the outgoing signals in a desired direction. Any of a wide variety of other functions could be supported in the eNB 102 by the controller/processor 324. In some embodiments, the controller/processor 324 includes at least one microprocessor or microcontroller.

The controller/processor 324 is also capable of executing programs and other processes resident in the memory 329, such as an OS. The controller/processor 324 can move data into or out of the memory 329 as required by an executing process.

The controller/processor 324 is also coupled to the backhaul or network interface 334. The backhaul or network interface 334 allows the eNB 102 to communicate with other devices or systems over a backhaul connection or over a network. The interface 334 could support communications over any suitable wired or wireless connection(s). For example, when the eNB 102 is implemented as part of a cellular communication system (such as one supporting 5G, LTE, or LTE-A), the interface 334 could allow the eNB 102 to communicate with other eNBs over a wired or wireless backhaul connection. When the eNB 102 is implemented as an access point, the interface 334 could allow the eNB 102 to communicate over a wired or wireless local area network or over a wired or wireless connection to a larger network (such as the Internet). The interface 334 includes any suitable structure supporting communications over a wired or wireless connection, such as an Ethernet or RF transceiver.

The memory 229 is coupled to the controller/processor 324. Part of the memory 229 could include a RAM, and another part of the memory 229 could include a Flash memory or other ROM.

As described in more detail below, the eNB 102 may include circuitry and/or programming for configuring transmissions on unlicensed spectrum. Although FIG. 3A illustrates one example of eNB 102, various changes may be made to FIG. 3A. For example, the eNB 102 could include any number of each component shown in FIG. 3A. As a particular example, an access point could include a number of interfaces 334, and the controller/processor 324 could support routing functions to route data between different network addresses. As another particular example, while shown as including a single instance of TX processing circuitry 314 and a single instance of RX processing circuitry 319, the eNB 102 could include multiple instances of each (such as one per RF transceiver). Also, various components in FIG. 3A could be combined, further subdivided, or omitted and additional components could be added according to particular needs.

Figure 3B:
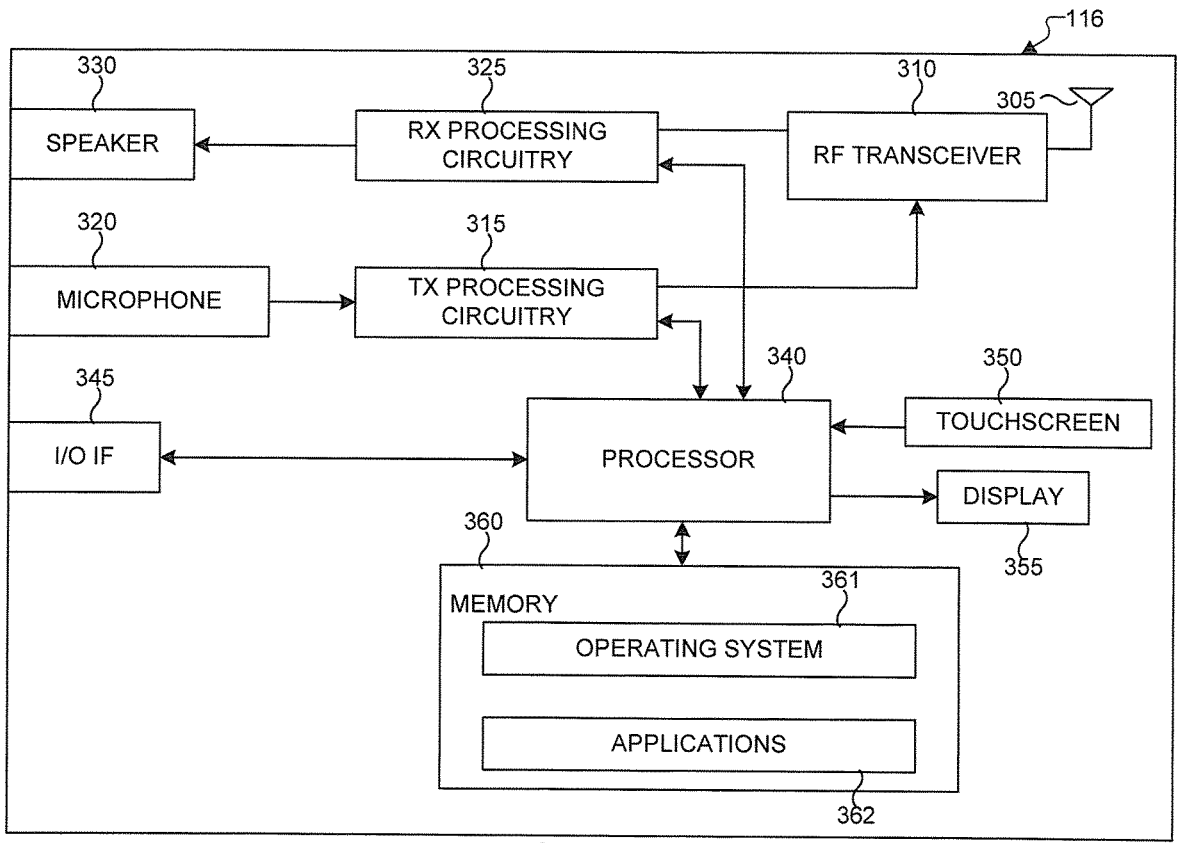
FIG. 3B illustrates an example UE according to illustrative embodiments of the present disclosure.

FIG. 3B illustrates an example UE 116 according to this disclosure. The embodiment of the UE 116 illustrated in FIG. 3B is for illustration only, and the UEs 111-115 of FIG. 1 could have the same or similar configuration. However, UEs come in a wide variety of configurations, and FIG. 3B does not limit the scope of this disclosure to any particular implementation of a UE.

As shown in FIG. 3B, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors and execute the basic OS program 361 stored in the memory 360 in order to control the overall operation of the UE 116. In one such operation, the main processor 340 controls the reception of forward channel signals and the transmission of reverse channel signals by the RF transceiver 310, the RX processing circuitry 325, and the TX processing circuitry 315 in accordance with well-known principles. The main processor 340 can also include processing circuitry configured to allocate one or more resources. For example, the processor 340 can include allocator processing circuitry configured to allocate a unique carrier indicator and detector processing circuitry configured to detect a physical downlink control channel (PDCCH) scheduling a physical downlink shared channel (PDSCH) reception of a physical uplink shared channel (PUSCH) transmission in one of the carriers. Downlink Control Information (DCI) serves several purposes and is conveyed through DCI formats in respective PDCCHs. For example, a DCI format may correspond to a downlink assignment for PDSCH receptions or to an uplink grant for PUSCH transmissions. In some embodiments, the processor 340 includes at least one microprocessor or microcontroller.

The processor 340 is also capable of executing other processes and programs resident in the memory 360, such as operations for inter-eNB coordination methods to support inter-eNB carrier aggregation. It should be understood that inter-eNB carrier aggregation can also be referred to as dual connectivity. The processor 340 can move data into or out of the memory 360 as required by an executing process. In some embodiments, the processor 340 is configured to execute a plurality of applications 362, such as applications for MU-MIMO communications, including obtaining control channel elements of PDCCHs. The processor 340 can operate the plurality of applications 362 based on the OS program 361 or in response to a signal received from an eNB. The main processor 340 is also coupled to the I/O interface 345, which provides UE 116 with the ability to connect to other devices such as laptop computers and handheld computers. The I/O interface 345 is the communication path between these accessories and the main controller 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3B illustrates one example of UE 116, various changes may be made to FIG. 3B. For example, various components in FIG. 3B could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3B illustrates the UE 116 configured as a mobile telephone or smartphone, UEs could be configured to operate as other types of mobile or stationary devices.

DL signals include data signals conveying information content, control signals conveying DL Control Information (DCI), and Reference Signals (RS), which are also known as pilot signals. An eNB transmits data information or DCI through respective Physical DL Shared Channels (PDSCHs) or Physical DL Control Channels (PDCCHs). Possible DCI formats used for downlink assignment include DCI format 1A, 1B, 1C, 1D, 2, 2A, 2B, 2C and 2D. A UE can be configured with a transmission mode which determines the downlink unicast reception method for the UE. For a given transmission mode, a UE can receive unicast downlink assignment using DCI format 1A and one of DCI format 1B, 1D, 2, 2A, 2B, 2C or 2D. An eNB transmits one or more of multiple types of RS including a UE Common RS (CRS), a Channel State Info nation RS (CSI-RS), and a Demodulation RS (DMRS). A CRS is transmitted over a DL system Bandwidth (BW) and can be used by UEs to demodulate data or control signals or to perform measurements. To reduce CRS overhead, an eNB may transmit a CSI-RS with a smaller density in the time and/or frequency domain than a CRS. For channel measurement, Non-Zero Power CSI-RS (NZP CSI-RS) resources can be used. For Interference Measurement Resources (IMRs), CSI Interference Measurement (CSI-IM) resources associated with a Zero Power CSI-RS (ZP CSI-RS) can be used. A UE can determine the CSI-RS transmission parameters through higher layer signaling from an eNB. DMRS is transmitted only in the BW of a respective PDSCH and a UE can use the DMRS to demodulate information in a PDSCH.

Figure 4:
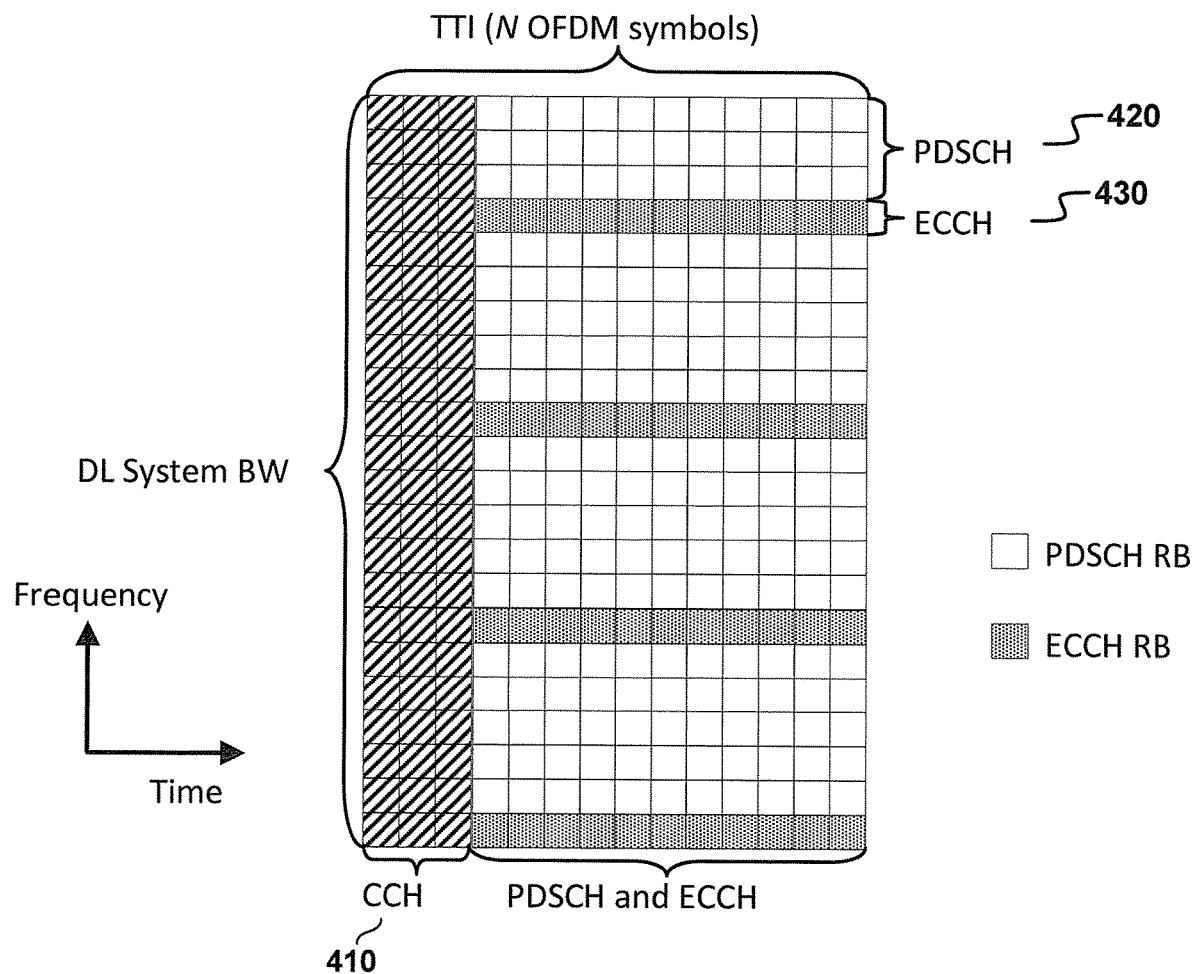
FIG. 4 illustrates an example structure of a downlink transmission time interval in which reference signals of the present disclosure may be transmitted and/or received.

FIG. 4 illustrates an example structure of a DL Transmission Time Interval (TTI) in which reference signals of the present disclosure may be transmitted and/or received. Referring to FIG. 4, DL signaling uses Orthogonal Frequency Division Multiplexing (OFDM) and a DL TTI has a duration of one millisecond (ms) and includes N=14 OFDM symbols in the time domain (or two slots) and K Resource Blocks (RBs) in the frequency domain. A first type of Control Channels (CCHs) is transmitted in a first $N_1$ OFDM symbols 410 (including no transmission, $N_1$=0). A remaining $N-N_1$ OFDM symbols are used primarily for transmitting PDSCHs 420 and, in some RBs of a TTI, for transmitting a second type of CCHs (ECCHs) 430. Each RB consists of $N_{sc}^{RB}$ sub-carriers, or Resource Elements (REs), and a UE is allocated $M_{PDSCH}$ RBs for a total of $M_{sc}^{PDSCH}=M_{PDSCH} \cdot N_{sc}^{RB}$ REs for the PDSCH transmission BW. A unit of 1 RB in frequency and of 1 slot in time is referred to as Physical RB (PRB).

Figure 5:
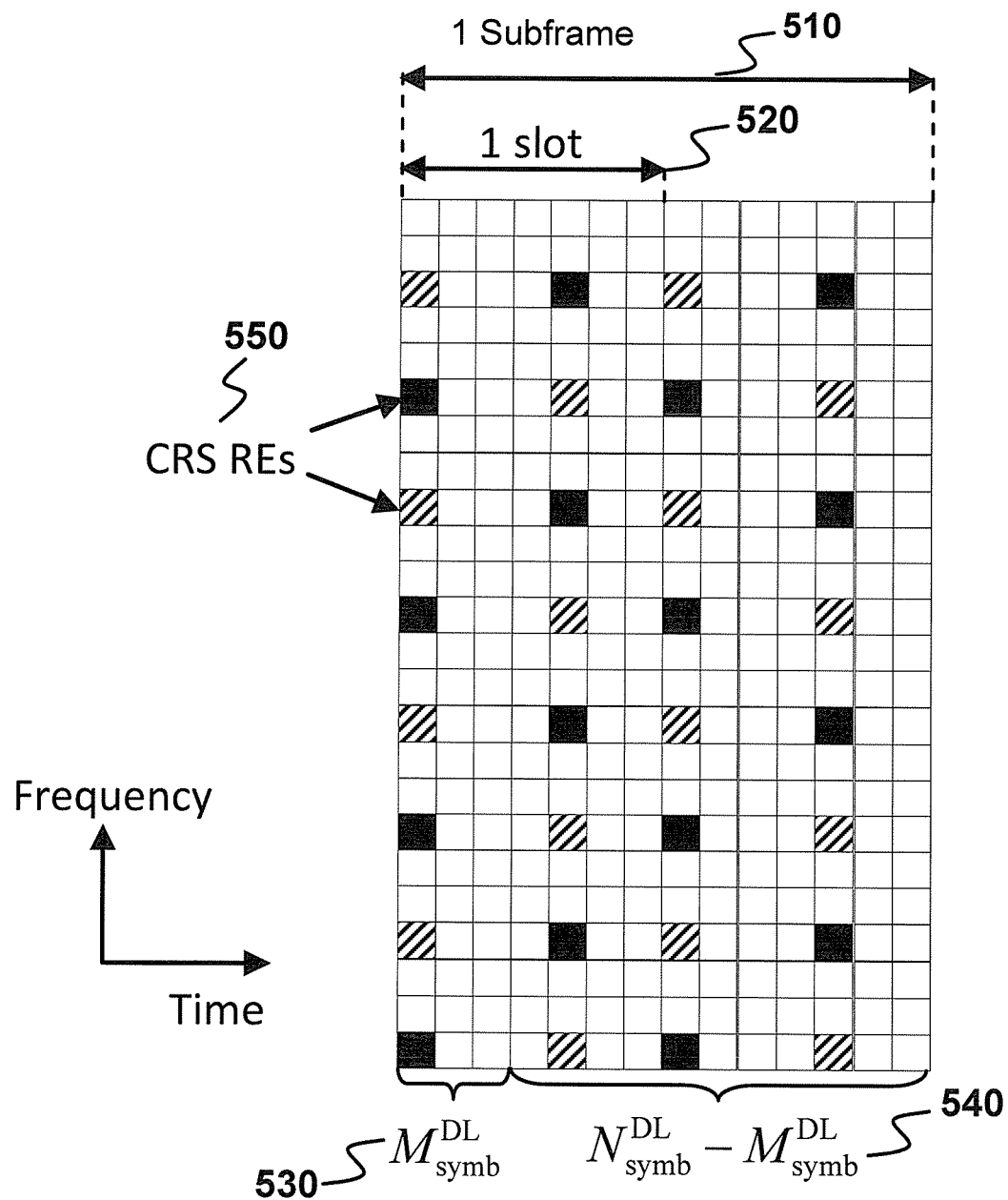
FIG. 5 illustrates an example common reference signal resource element mapping within a subframe in which reference signals of the present disclosure may be transmitted and/or received.

FIG. 5 illustrates an example CRS RE mapping within a subframe in which reference signals of the present disclosure may be transmitted and/or received. To assist cell search and synchronization, DL signals also include synchronization signals such as a Primary Synchronization Signal (PSS) and a Secondary Synchronization Signal (SSS). Although having a same structure, the time-domain positions of synchronization signals within a frame that includes ten subframes can differ depending on whether a cell is operating in Frequency Division Duplex (FDD) or Time Division Duplex (TDD). Therefore, after acquiring the synchronization signals, a UE can determine whether a cell operates in FDD or in TDD and a subframe index within a frame. The PSS and SSS occupy the central 72 sub-carriers, also referred to as Resource Elements (REs), of an operating bandwidth. Additionally, the PSS and SSS can inform of a Physical Cell Identifier (PCID) for a cell and therefore, after acquiring the PSS and SSS, a UE can know the PCID of the transmitting cell.

Figure 6:
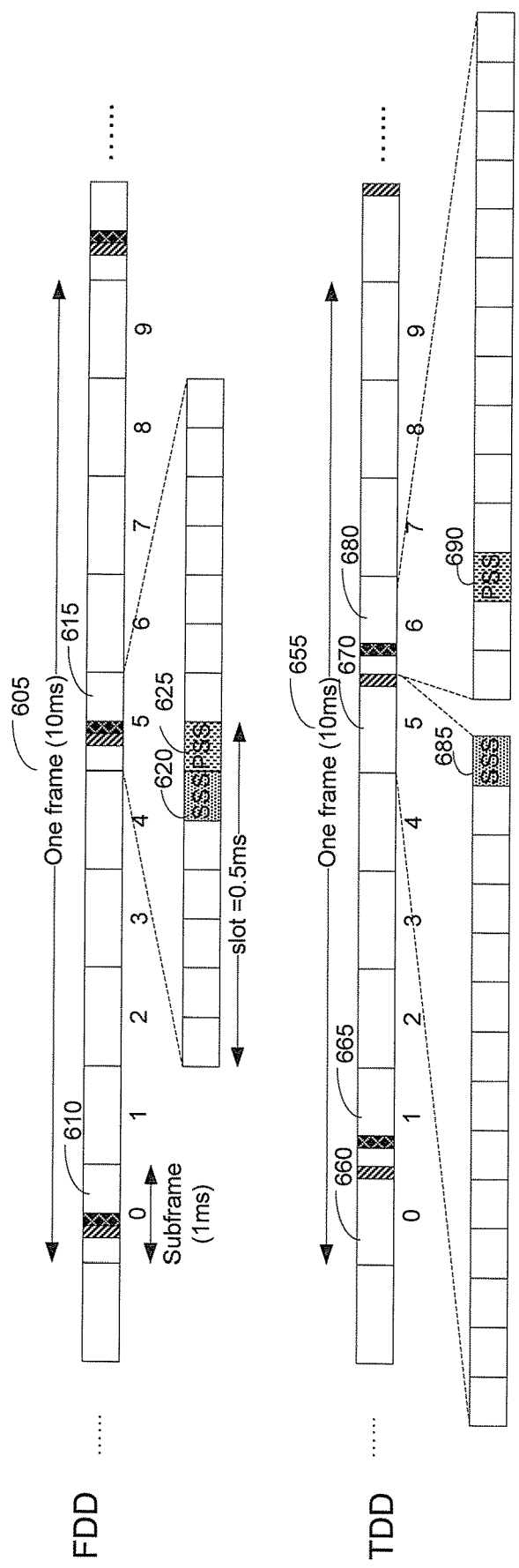
FIG. 6 illustrates example time domain positions for primary synchronization signals and secondary synchronization signals for frequency division duplexing or time division duplexing which can be utilized in accordance with various embodiments of the present disclosure.

FIG. 6 illustrates example time domain positions for PSS/SSS for FDD and TDD which can be utilized in accordance with various embodiments of the present disclosure. Referring to FIG. 6, in case of FDD, in every frame 605, a PSS 625 is transmitted within a last symbol of a first slot of subframes 0 and 5 (610 and 615), wherein a subframe includes two slots. A SSS 620 is transmitted within a second last symbol of a same slot. In case of TDD, in every frame 655, a PSS 690 is transmitted within a third symbol of subframes 1 and 6 (665 and 680), while a SSS 685 is transmitted in a last symbol of subframes 0 and 5 (660 and 670). The difference allows for the detection of the duplex scheme on a cell. The resource elements for PSS and SSS are not available for transmission of any other type of DL signals. The example RE mappings and time domain positions illustrated in FIGS. 5 and 6 apply to Rel. 8-12 and may not be utilized for LAA in Rel-13.

The Federal Communications Commission (FCC) defined unlicensed carriers to provide cost-free public access spectrum. Use of unlicensed carriers by a UE is allowed only under the provisions that the UE does not generate noticeable interference to communications in licensed carriers and that communications in unlicensed carriers are not protected from interference. For example, unlicensed carriers include the industrial, scientific and medical (ISM) carriers and the Unlicensed National Information Infrastructure (UNII) carriers that can be used by IEEE 802.11 devices. It may be possible to deploy LTE radio access technology (RAT) on an unlicensed frequency spectrum, which is also known as Licensed Assisted Access (LAA) or LTE-Unlicensed (LTE-U).

Figure 7:
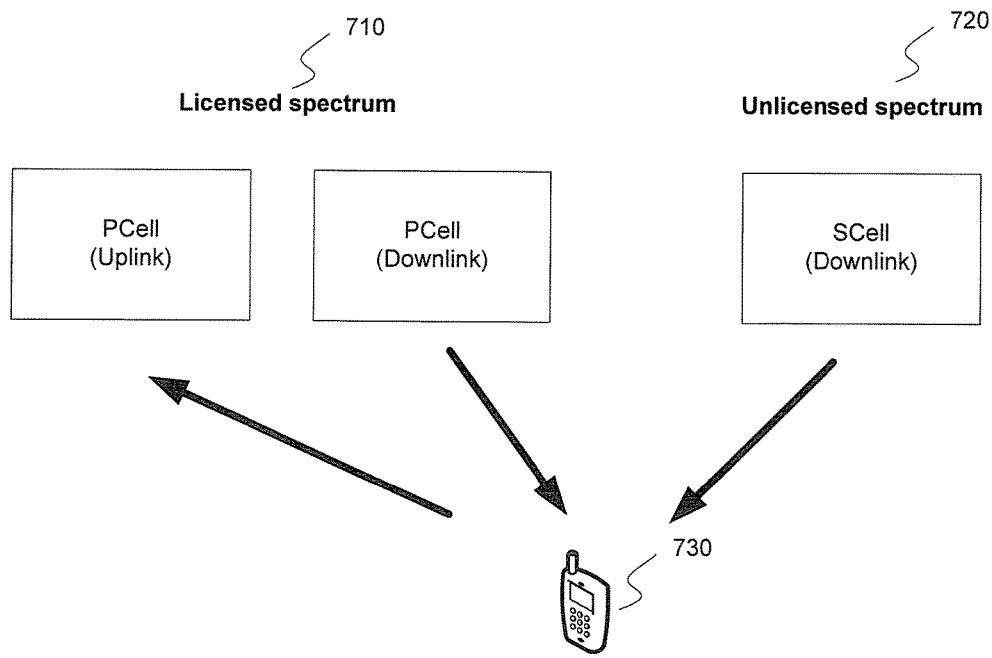
FIG. 7 illustrates an example of a carrier aggregation of a carrier on licensed spectrum and a carrier on an unlicensed spectrum in accordance with various embodiments of the present disclosure.

FIG. 7 illustrates an example of a carrier aggregation of a carrier on licensed spectrum and a carrier on an unlicensed spectrum in accordance with various embodiments of the present disclosure. As illustrated in FIG. 7, an example deployment scenario for LAA/LTE-U is to deploy an LAA/LTE-U carrier as a part of carrier aggregation, where an LAA/LTE-U carrier is aggregated with another carrier on a licensed spectrum. In a typical arrangement, the carrier on the licensed spectrum 710 is assigned as the Primary Cell (PCell) and the carrier on the unlicensed spectrum 720 is assigned as the Secondary Cell (SCell) for a UE 730 (e.g., such as UE 116). In the example embodiment of FIG. 7 the wireless communication resources of the LAA/LTE-U cell include a downlink carrier without an uplink carrier.

Because there may be other RATs operating on the same unlicensed spectrum as the LAA/LTE-U carrier, embodiments of the present disclosure recognize a need to enable co-existence of other RAT with LAA/LTE-U on an unlicensed frequency spectrum. One possible method is to create a Time-Division-Multiplexing (TDM) transmission pattern between a LAA/LTE-U transmitter (e.g., in eNB 102) and transmitters of other RATs such as a WiFi Access Point. Carrier Sense Multiple Access (CSMA) can be applied, for example before a UE or a eNB transmits, the UE or eNB monitors a channel for a predetermined time period to determine whether there is an ongoing transmission in the channel. If no other transmission is sensed in the channel, the UE or the eNB can transmit; otherwise, the UE or the eNB postpones transmission.

Figure 8:
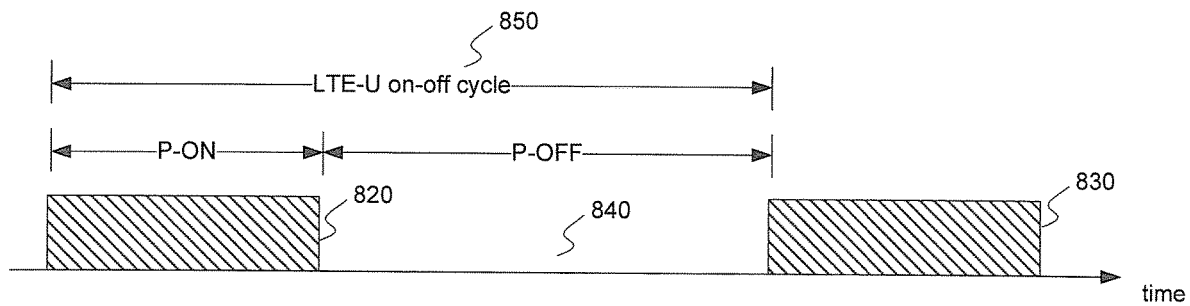
FIG. 8 illustrates an example of a time-division multiplexing transmission pattern of a LTE-U downlink carrier in accordance with various embodiments of the present disclosure.

FIG. 8 illustrates an example of a TDM transmission pattern or transmission burst of a LAA/LTE-U downlink carrier in accordance with various embodiments of the present disclosure. Referring to FIG. 8, the LAA/LTE-U carrier is ON for a period P-ON (820 & 830) and is OFF for a period P-OFF 840. When the LAA/LTE-U carrier is ON, LTE signals are transmitted including at least one of PSS, SSS, CRS, DMRS, PDSCH, PDCCH, EPDCCH and CSI-RS; whereas when the LAA/LTE-U carrier if OFF, the UE or the eNB does not transmit any signals, with a possible exception of a discovery reference signal (DRS) with relatively long transmission periodicity. DRS can be used by a UE for discovery of the LTE cell, synchronization to the LTE cell, RRM and CSI measurements of the LTE cell. Unless stated otherwise, it may be assumed hereafter that nothing is transmitted by the eNB of the LAA/LTE-U cell if the carrier is denoted as OFF. An LAA/LTE-U on-off cycle 850 can be defined to be P-ON (820 or 830)+P-OFF 840. The duration of the LAA/LTE-U on-off cycle 850 can be fixed or semi-statically configured. For example, the duration of on-off cycle 850 can be of 100 s of milliseconds. The ON period (820 & 830) (or maximum channel occupancy time) can have a maximum duration as defined by regulation, e.g., 10 ms (according to European regulation, ETSI EN 301893 V1.7.1). The length for P-ON (820 & 830) can be adjusted or adapted by the scheduler of the LAA/LTE-U according to the buffer status or traffic pattern at the LAA/LTE-U carrier and a co-existence metric requirement or target. WiFi APs or other RAT transmitters may utilize the P-OFF 840 period for transmissions since the carrier is free from LAA/LTE-U interference. The measurement for the co-existence metric can be performed by the eNB of the LAA/LTE-U cell during the off period of the LTE-U carrier to estimate the radio activity level of the spectrum. The adaptation of P-ON (820 & 830) and P-OFF 840 can be performed per on-off cycle or per multiple on-off cycles. Signaling of ON or OFF of LAA/LTE-U cell to a UE can be done using SCell MAC activation and deactivation command. SCell MAC activation command can be sent via another serving cell such as the PCell. SCell MAC deactivation command can be sent from any serving cell, including the LAA/LTE-U cell.

When a SCell is deactivated, the UE does not receive data on the SCell. However, UE processing time of SCell MAC activation and deactivation command can be up to 6 ms (e.g., as described in 3GPP TS 36.331 v12.2.0). There can also be additional delay from UE RF preparation and synchronization, as such there can be up to 24 ms SCell activation delay according to Rel-10-12 LTE (e.g., as described in 3GPP TS 36.133 v12.7.0). To enable faster utilization of the unlicensed spectrum, embodiments of the present disclosure recognize a need for enhanced methods for the UE to determine if the LTE cell on unlicensed spectrum has started or has ended transmissions.

If a listen-before-talk (LBT) protocol is applied, there can be an idle period after the end of channel occupancy, where (e.g., for a frame-based equipment) a minimum idle period of (e.g., 5% of the channel occupancy time) can be specified (e.g., according to European regulation, ETSI EN 301893 V1.7.1 for Frame Based Equipment). The idle period can include a Clear Channel Assessment (CCA) period towards the end of the idle period, where carrier sensing is performed by the UE. Other LBT protocol such as that specified for Load Based Equipment is also possible (e.g., as described in ETSI EN 301 893 V1.7.1).

In various embodiments, Discovery Reference Signals (DRS) can be transmitted by an eNB for an LTE cell on an unlicensed spectrum. DRS comprises of physical signals such as PSS, SSS, CRS and CSI-RS, if configured. The purposes or functions of DRS for an LTE cell on an unlicensed spectrum include, but may not be limited to, discovery of the LTE cell or a transmission point (TP) in the cell (e.g., an eNB, BS, RRH, etc.), synchronization to the LTE cell or TP, RRM and CSI measurements of the LTE cell or TP. CSI-RS can be configured for TP identification purpose or for CSI measurement purpose.

A DRS transmission instance by a cell/TP is sometimes referred to in the following as a DRS occasion of the cell/TP. The duration of a DRS occasion can be either fixed or configurable (e.g., by RRC) by the network. The duration (in unit of ms or subframes) can be 1, 2, 3, 4 or 5. The possible DRS occasion duration can also depend on the duplexing mode (e.g., for FDD, the duration can be 1 to 5 and for TDD, the duration can be 2 to 5).

Figure 9A:
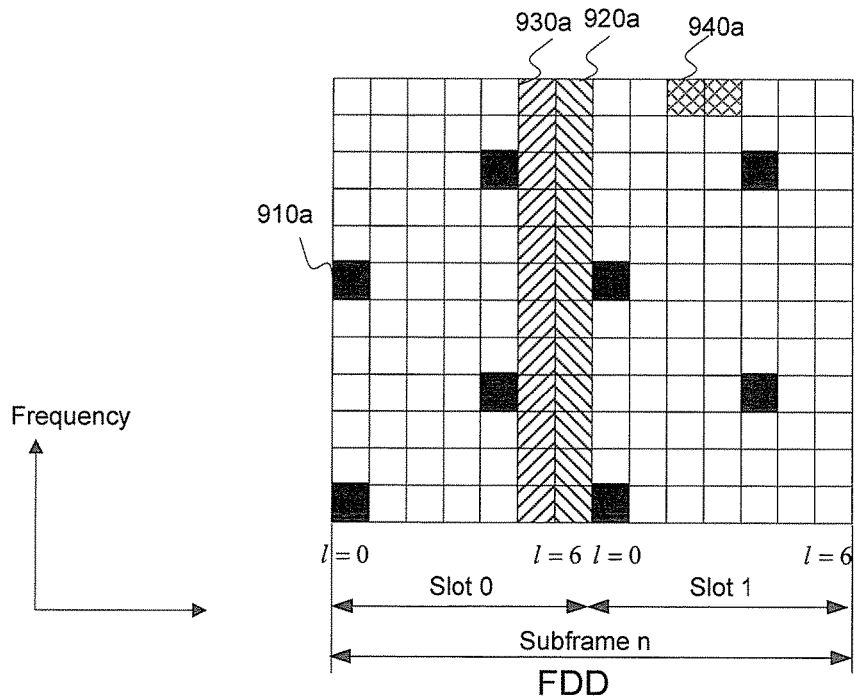
FIGS. 9A and 9B illustrate example structures of physical signals and corresponding RE mappings for a discovery reference signal occasion of a 1 ms duration for frequency division duplexing and a discovery reference signal occasion of 2 ms duration for time division duplexing, respectively, in accordance with various embodiments of the present disclosure.
Figure 9B:
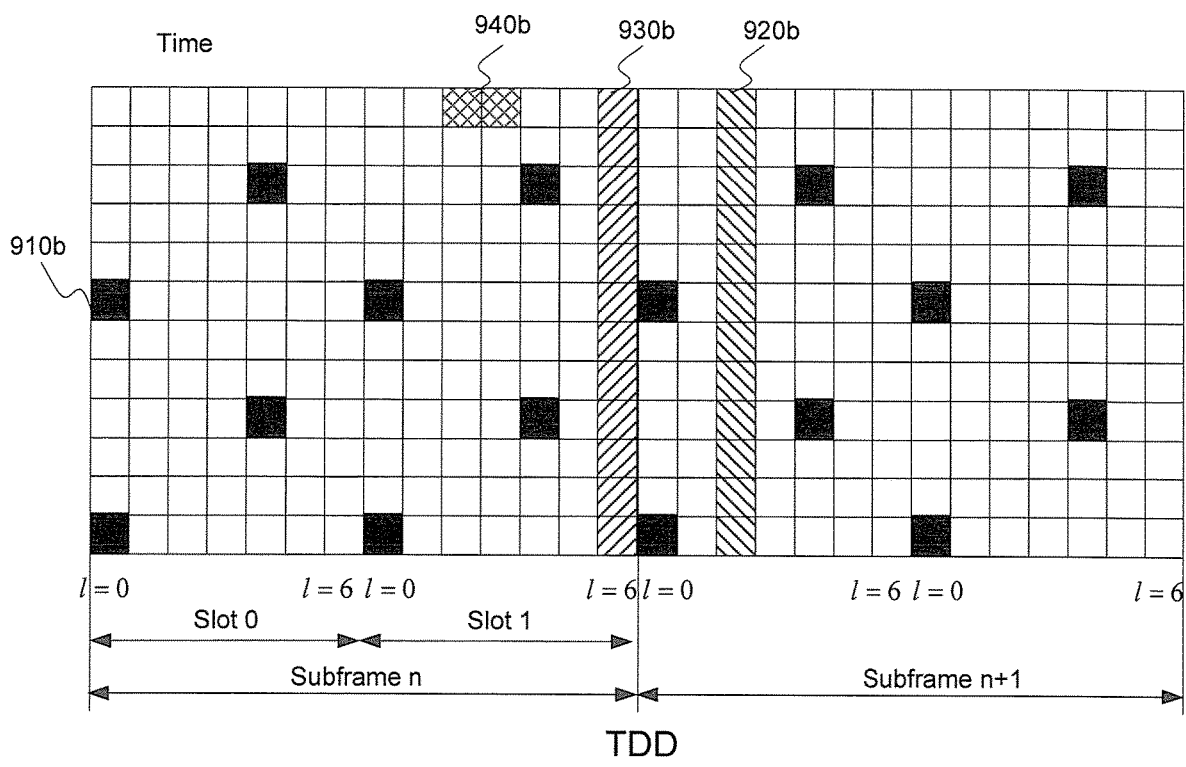

FIGS. 9A and 9B illustrate example structures of physical signals and corresponding RE mappings for a DRS occasion of a 1 ms duration for FDD and a DRS occasion of 2 ms duration for TDD, respectively, in accordance with various embodiments of the present disclosure. FIG. 9B illustrates an example structure of physical signals and corresponding RE mappings for in accordance with various embodiments of the present disclosure. With reference to FIGS. 9A and 9B, a DRS occasion can include CRS (910*a*, 910*b*) (e.g., antenna port 0 and as also discussed in 3GPP TS 36.211 v12.2.0), PSS (920*a*, 920*b*), SSS (930*a*, 930*b*) and CSI-RS (940*a*, 940*b*). The CSI-RS may only be present in a DRS occasion if the CSI-RS is configured. The location of the CSI-RS REs can be in any location allowed by the LTE Rel-10/11 specifications (e.g., 3GPP TS 36.211 v12.2.0 and 3GPP TS 36.213 v12.2.0) or can be a new location designed for operation in an unlicensed carrier. Multiple CSI-RS resources can also be transmitted within the same DRS occasion and can be over multiple subframes. The second subframe of the DRS occasion for TDD can be a special subframe, in which case, CRS is only present in the Downlink Pilot Time Slot (DwPTS) region of the subframe.

Figure 10A:
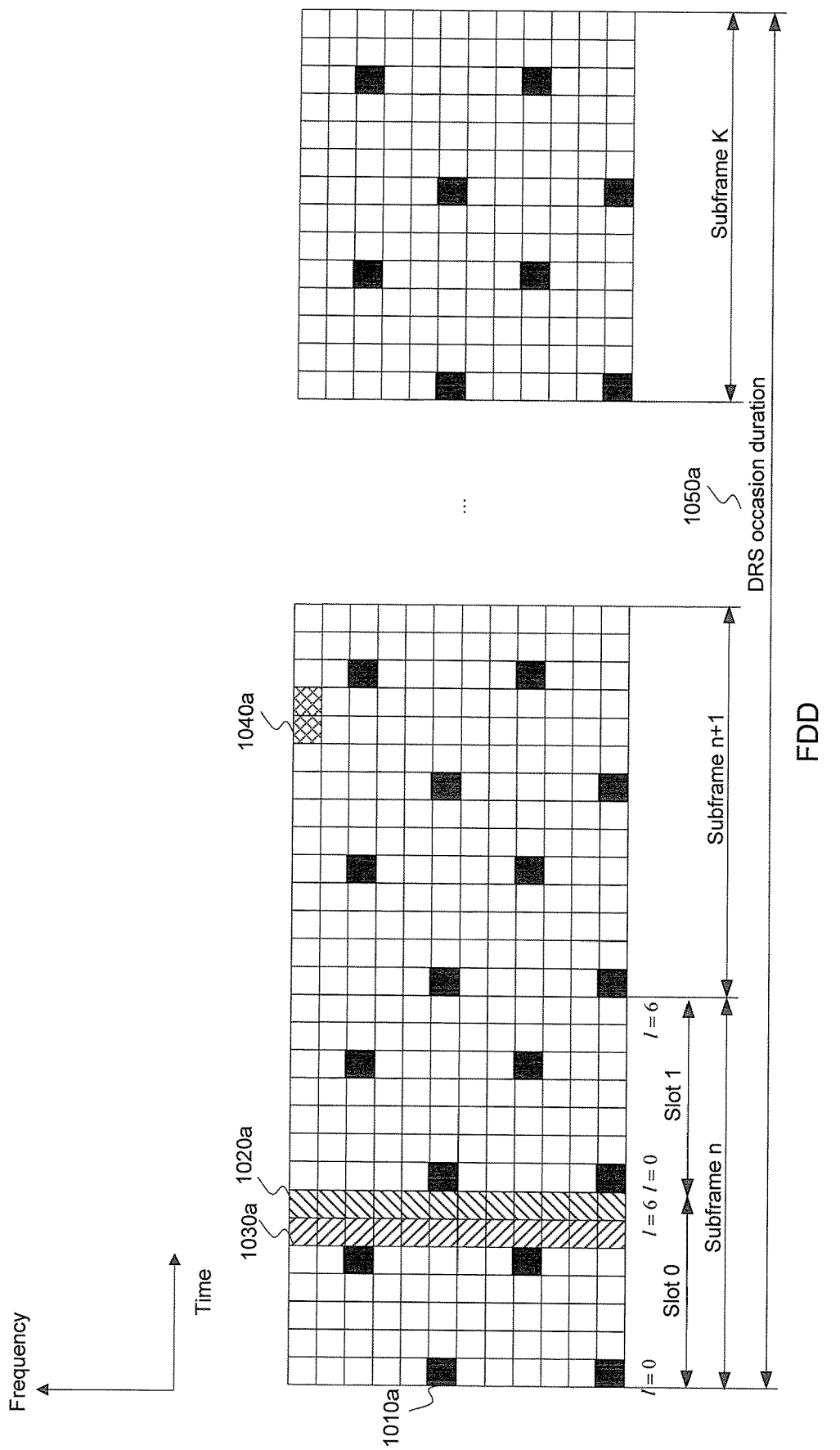
FIGS. 10A and 10B illustrate example subframe structures including a discovery reference signal occasion with duration of K ms for frequency division duplexing and for time division duplexing, respectively, in accordance with various embodiments of the present disclosure.
Figure 10B:
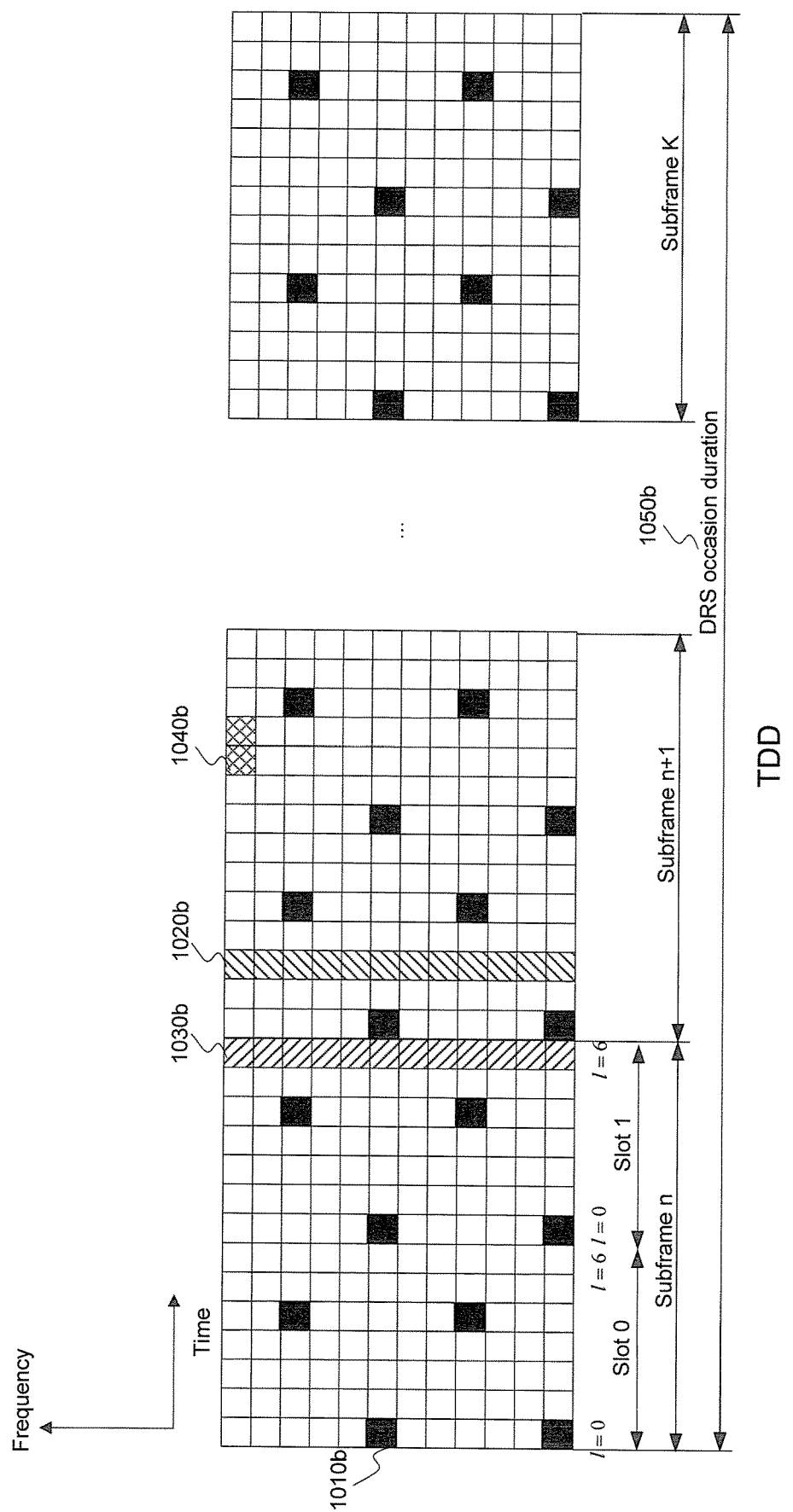

FIGS. 10A and 10B illustrate example subframe structures including a DRS occasion with duration of K ms (e.g., K≤5) for FDD and for TDD, respectively, in accordance with various embodiments of the present disclosure. With reference to FIGS. 10A and 10B, CRS (1010*a*, 1010*b*) (e.g., antenna port 0) can be transmitted in all DL subframes and in the DwPTS of special subframes. PSS (1020*a*, 1020*b*) and SSS (1030*a*, 1030*b*) are transmitted once over the DRS occasion duration and their locations within the DRS occasion can be fixed or configurable by the network. In an example of fixed PSS and SSS locations, the PSS and the SSS can be transmitted in the first subframe of the DRS occasion for FDD, whereas for TDD, the SSS and the PSS can be transmitted in the first and the second subframe of the DRS occasion, respectively. The CSI-RS (1040*a*, 1040*b*) may only be present in a DRS occasion if the CSI-RS is configured. For a DL-only carrier (e.g., also known as Supplementary Downlink), the DRS structure of FDD can be used because 1 ms DRS occasion duration is possible for the FDD DRS (e.g., to achieve a lower DRS overhead).

In order to improve PSS and SSS detection reliability, more than one PSS and one SSS can be transmitted in a DRS occasion. For example, PSS and SSS can be transmitted in every subframe of a DRS occasion or every other subframe. Another example can be implemented as described in U.S. Provisional Applications 62/074,54; 62/086,018; 62/092,120; 62/131,687; and 62/134,386. The overhead of CRS can also be reduced, especially if CRS is not used as demodulation RS for control or data channels. For example, CRS may only be present in the first subframe of a DRS occasion.

Embodiments of the present disclosure recognize that there may be a need to define a method for a UE to determine or detect the transmission period (P-ON) of a LTE cell or TP on an unlicensed spectrum. hereinafter, the entity that transmits the DRS is referred to as a "cell" for simplicity, it should be understood that embodiments described herein are also applicable when the entity that transmits DRS is a "TP" (e.g., an eNB, RRH, BS or other network entity).

Figure 11A:
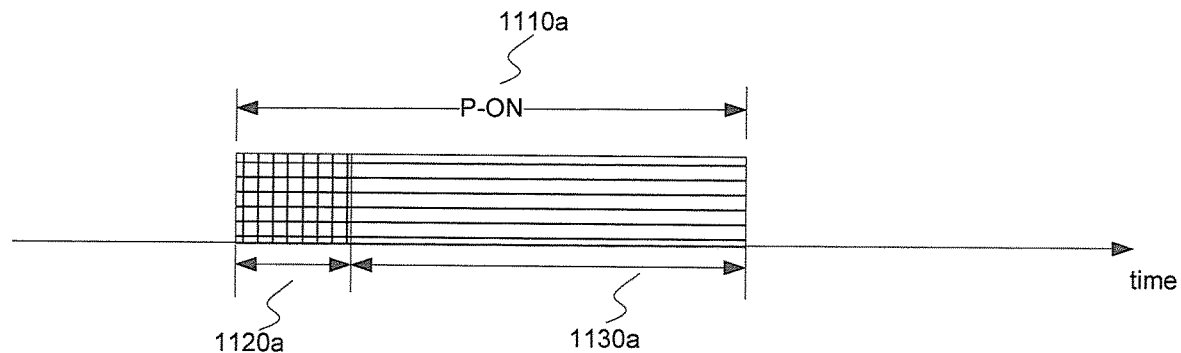
FIGS. 11A-11C illustrate example configurations for DRS transmissions relative to other physical signals or channels in accordance with various embodiments of the present disclosure.
Figure 11B:
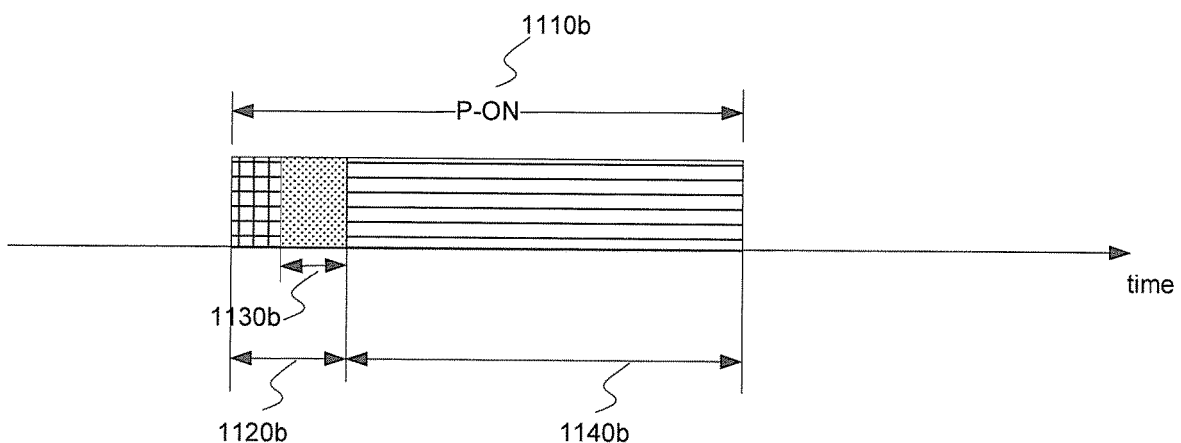

In one embodiment, DRS transmission by an LTE cell on unlicensed spectrum precedes other physical signals (e.g., DM-RS, PRS) or physical channels (e.g., PDCCH, EPDCCH, PDSCH, PMCH) received by the UE (that is, DRS is transmitted before transmissions of other physical signals or physical channels). If control and data can be received by the UE on the LTE cell, then the cell is configured as a serving cell (including Secondary Cell (SCell)); otherwise the LTE cell can be a neighboring non-serving cell that the UE can measure for RRM purpose. This transmission structure enables the UE to perform synchronization (including setting FFT window timing), automatic gain control (AGC) tracking, and RF tuning using the DRS before reception of control or data signals. Upon the end of a transmission instance (P-ON instance), the UE may not need to maintain synchronization with the LTE cell until a next DRS transmission instance and this can save UE power. It is noted that the DRS transmission does not need to occur in a periodic manner and does not need to be restricted to fixed subframes such as the PSS/SSS in Rel-12 (e.g., subframe 0 or subframe 5 for FDD). A DRS occasion can be transmitted by a network entity when the network entity requires a measurement report from a UE or needs to send control or data signals to a UE. An example is illustrated in FIGS. 11A and 11B, where for an ON period of the LTE cell (1110a, 1110b), DRS (1120a, 1120b), which can span one or multiple subframes (e.g., 1, 2, 3, 4, 5) is transmitted first, followed by transmissions of other physical signals and physical channels. Note that although DRS is referred to as the reference signal in these embodiments, it should be understood that this embodiment extends to any transmission structure that includes PSS, SSS, CRS, and possibly also CSI-RS, in the beginning of a transmission period.

Figure 11C:
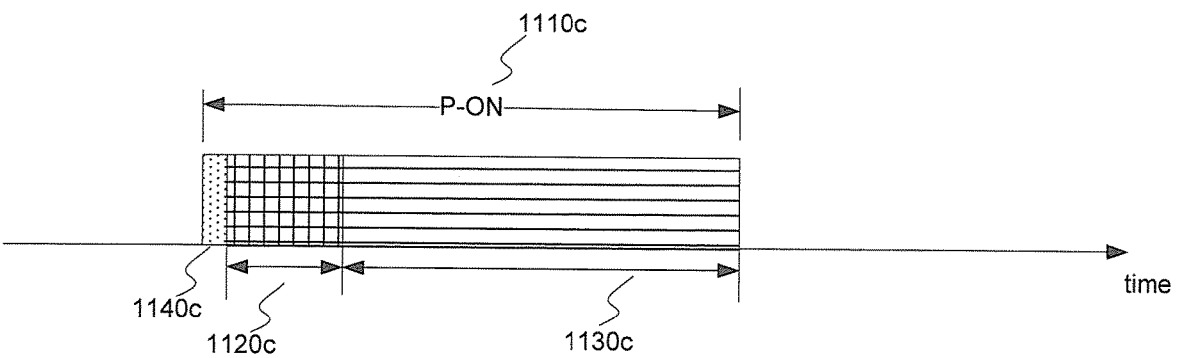

In another embodiment, the entire DRS occasion is transmitted first and is then followed by transmissions of the other physical signals or channels, as illustrated, for example, in FIG. 11A. This implies that the UE can only be required to receive DRS during the DRS occasion 1120a and may not be required to receive other signals or channels, such as PDCCH/EPDCCH/PDSH during the DRS occasion. After the end of DRS occasion transmission, the UE can then begin to receive the other signals or channels 1130a. The resource elements not mapped to PSS/SSS/CRS/CSI-RS in the DRS occasion can be transmitted with any signal that meets the regulatory requirements for the purpose of reserving the channel, which can be referred to as 'reservation signal'. The reservation signal can also be transmitted prior to the DRS occasion transmission for the purpose of channel reservation after the eNB has fulfilled the CCA requirement. One example of this is illustrated in FIG. 11C, where the reservation signal 1140c is transmitted prior to the DRS occasion 1120c.

In another embodiment, as illustrated, for example, in FIG. 11B, transmissions of other physical signals or physical channels (1130b) can begin before the end of DRS occasion transmission (1120b) and continue after the end of DRS occasion transmission (1140b). This implies that the UE can be required to receive the other physical signals or physical channels before the end of DRS occasion reception. This is advantageous in case synchronization and AGC tracking operation at the UE only require the first portion of DRS subframes for sufficiently reliable reception of physical channels, but RRM and/or CSI measurements based on DRS may require longer time. As an example, if the DRS occasion duration is 5 ms, transmissions of other physical signals or physical channels may begin from the second subframe. The resource elements not mapped to PSS/SSS/CRS/CSI-RS or other physical channel in the DRS occasion can be transmitted with any signal that meets the regulatory requirements for the purpose of reserving the channel, which can be referred to as 'reservation signal'. Similar to the first alternative, the reservation signal can also be transmitted prior to the DRS occasion transmission for the purpose of channel reservation after the eNB has fulfilled the CCA requirement.

In yet another embodiment, physical channels and the other physical signals other than DRS can be transmitted from the start of a DRS occasion transmission (1120c), (e.g., the UE can be required to receive DRS as well as the other physical signals and physical channels from the beginning of P-ON (1110c)). UE reception of the other physical signals and physical channels can continue after the end of DRS occasion transmission (1130c). Certain conditions may need to be fulfilled for this embodiment, for example, that the UE is still sufficiently synchronized with the LTE cell before the start of P-ON. This condition can be met if the end of DL subframe (or DwPTS) of the previous P-ON received by the UE is less than a certain time which can be predefined or configurable by the network or recommended/requested by the UE to the network (X ms, e.g., X=5 ms or 10 ms or 20 ms or 40 ms or 80 ms or 160 ms) before the first DL subframe of the current P-ON. If the condition is not met, the example configuration discussed above with regards to FIG. 11a or 11B can be applied.

Figure 12:
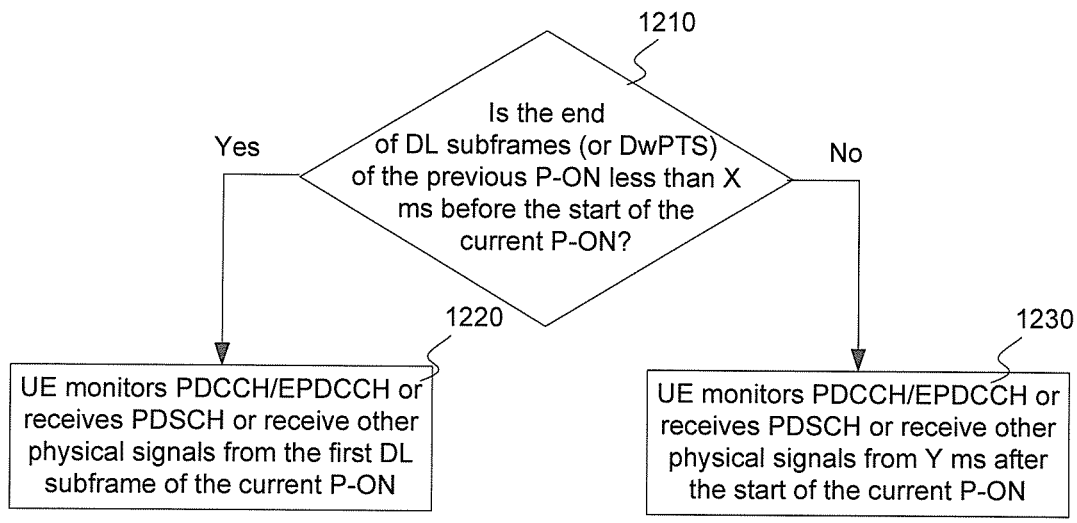
FIG. 12 illustrates a flowchart for an example process for determining when to start receiving physical channels for a P-ON instance in accordance with various embodiments of the present disclosure.

FIG. 12 illustrates a flowchart for an example process for determining when to start receiving physical channels for a P-ON instance in accordance with various embodiments of the present disclosure. For example, the process illustrated in FIG. 12 may be implemented by the UE 116. In this illustrative embodiment, some or all resource elements not mapped to PSS/SSS/CRS/CSI-RS in the DRS occasion can be transmitted with a physical signal or channel that carries information, e.g., control messages (e.g., PDCCH/EPDCCH), broadcast messages, unicast messages (e.g., PDSCH) etc. For example, resource elements not mapped to PSS/SSS/CRS/CSI-RS in the first few OFDM symbols in time or all OFDM symbols of the DRS occasion can be used to transmit such physical signal or channel. Similar to the example embodiments discussed above with regard to FIG. 11A, the reservation signal (1140c) can also be transmitted prior to the DRS occasion transmission for the purpose of channel reservation after the eNB has fulfilled the CCA requirement.

In this embodiment, the UE determines from DRS detection whether the current subframe is the start of a new P-ON transmission instance (1210). If the UE further determines that it has been no more than X ms after the end of DL subframe (or DwPTS) of the previous P-ON instance, the UE monitors PDCCH/EPDCCH or receives PDSCH or receives other physical signals from the first subframe of the new P-ON instance (1220). Otherwise, if the UE further determines that it has been more than X ms after the end of DL subframe (or DwPTS) of the previous P-ON instance, the UE performs synchronization and AGC tracking first and only monitors PDCCH/EPDCCH or receives PDSCH or receives other physical signals from Y ms after the start of the new P-ON instance (1230). It is noted that P-ON transmission instance can also include DRS occasion transmission for cell discovery, RRM and/or coarse synchronization purpose (e.g., without unicast data transmission in the same P-ON transmission instance). In another example, the UE can still receive PDCCH/EPDCCH/PDSCH (or other physical signals) from the first subframe of the new P-ON instance, despite determining that it has been more than X ms after the end of DL subframe (or DwPTS) of the previous P-ON instance; but in order to improve decoding reliability, especially for control/data in the first subframe or the first few subframes, low modulation and coding scheme (MCS) can be used by the network for the EPDCCH/PDCCH/PDSCH.

The transmission/reception of DRS occasion can also depend on certain conditions. For example, the condition can be based on the time difference between the end of the DL subframe (or DwPTS) of the previous P-ON instance and the start of the DL subframe of the current P-ON instance. An example of this is illustrated in FIG. 13 where it is assumed all subframes within the P-ON instances are DL subframes.

FIGS. 13A and 13B illustrate example LAA/LTE-U carriers with DRS occasion transmission depending on the time difference between of the end of the previous P-ON instance and the start of the current P-ON instance in accordance with various embodiments of the present disclosure. Referring to FIG. 13, the time difference between the end of the DL subframe of a first P-ON instance (1310a, 1310b) and the start of the DL subframe of a second P-ON instance (1350a, 1350b) is represented by P-OFF. If P-OFF is greater than or equal to X ms (e.g., X=5 ms or 10 ms or 20 ms or 40 ms or 80 ms or 160 ms), then DRS occasion 1360a is transmitted for the second P=ON instance; otherwise (1340b) DRS occasion is not transmitted for the second P-ON instance (e.g., it is assumed that the UE's synchronization to the cell and its AGC setting are still valid). This threshold "X" can be predefined or configurable by the network or recommended/requested by the UE to the network (e.g., in which case the value X can be UE-specific). Although not shown in the FIG. 13 for simplicity, it is noted that reservation signal can be transmitted in the beginning of the P-ON duration.

PSS and SSS transmissions on a LTE cell on an unlicensed spectrum can be modified. In a first example, only a single set of PSS and SSS is transmitted for a single instance of P-ON (i.e. as a part of DRS). In a second example, a second set of PSS and SSS can be transmitted after a predetermined or configurable number of subframes after the transmission of the first set if PSS and SSS, e.g., 5 ms. In a third example, it is possible for a network entity to configure (e.g., by RRC) whether the first or the second option shall be assumed by the UE.

When DL cross-scheduling is configured, i.e., the PDSCH on the unlicensed carrier is scheduled from another serving cell, the PDSCH can also start from the first OFDM symbol of the subframe (e.g., there is no control region for PDCCH).

If DRS transmission precedes other DL transmissions, a UE can perform DRS detection in order to detect a new P-ON instance. DRS detection can be performed by detecting the PSS, the SSS and/or the CRS/CSI-RS. For example, time-domain correlation can be performed on PSS/SSS to detect potential new P-ON instance, followed by CRS detection to minimize or reduce a chance of a false alarm. However, power savings can be achieved if the UE only performs DRS detection when instructed by the network. In addition, if the UE is required to buffer samples while performing DRS detection, such as the case for the example DRS transmission structures discussed above with regard to FIG. 11b or 11C, UE buffer saving can be achieved with the signaling as well.

Figure 14:
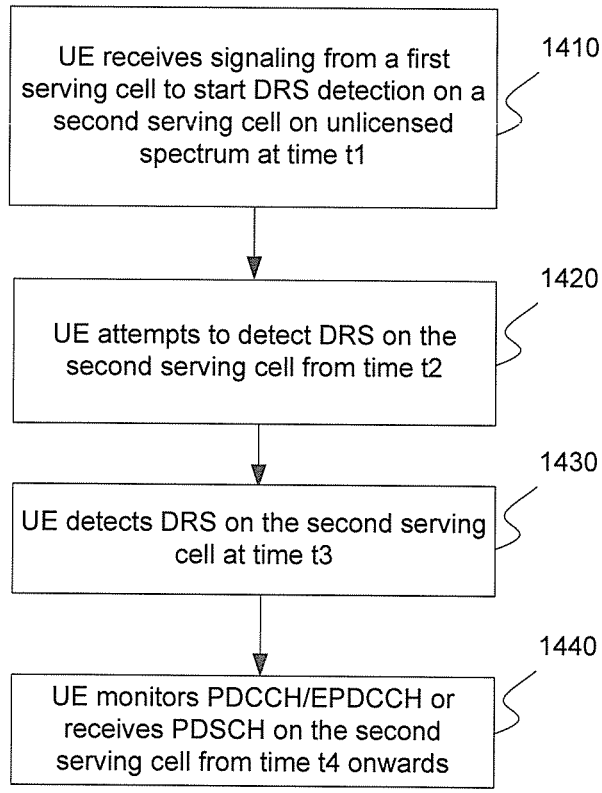
FIG. 14 illustrates a flowchart for an example process for DL reception on a LTE cell on unlicensed spectrum in accordance with various embodiments of the present disclosure.

FIG. 14 illustrates a flowchart for an example process for DL reception on a LTE cell on unlicensed spectrum in accordance with various embodiments of the present disclosure. For example, the process illustrated in FIG. 14 may be implemented by the UE 116. In this illustrative embodiment, upon receiving a signaling from a first serving cell (e.g., primary cell or another serving cell on a licensed band) that instructs the UE to begin DRS detection on a second serving cell on a unlicensed band at time t1 (1410), the UE listens for and/or attempts to detect DRS on the second serving cell from time t2 (t2>t1) onwards (1420). If the UE detects DRS on the second serving cell at time t3 (t3≥t2) (1430), the UE synchronizes with the cell and starts to monitor PDCCH/EPDCCH or receive PDSCH from time t4 onwards (t4>t3) (1440).

Figure 15:
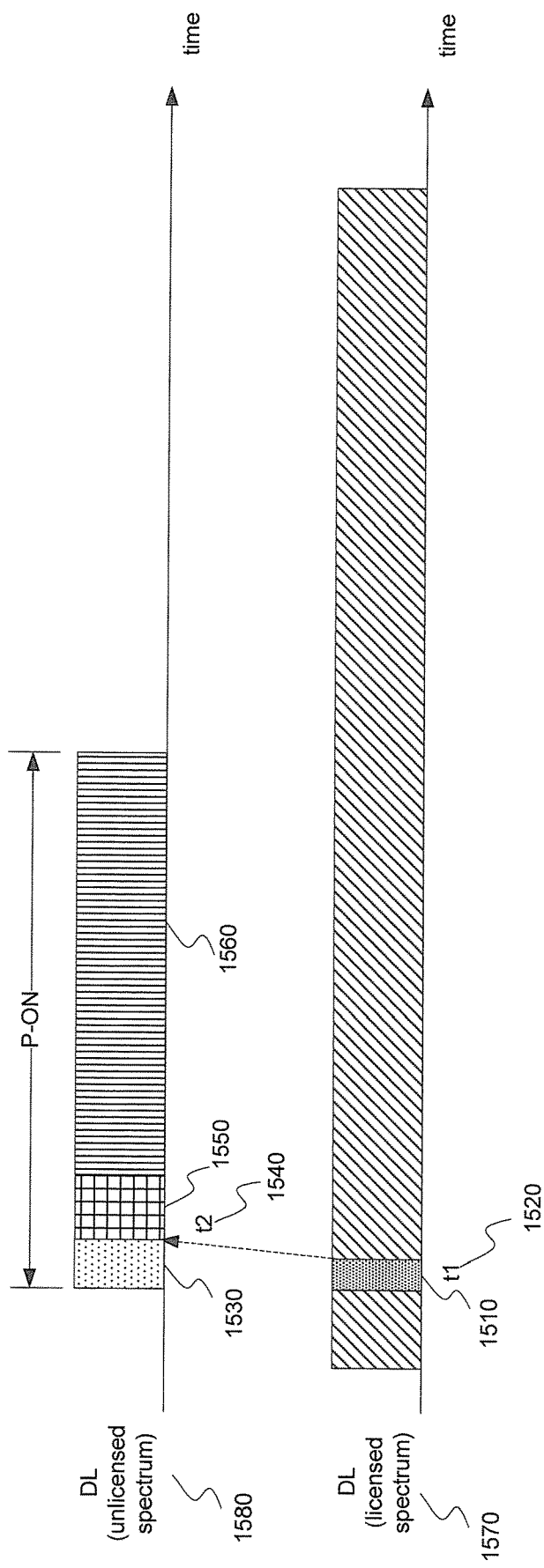
FIG. 15 illustrates an example of timing of signaling for triggering DRS detection in accordance with various embodiments of the present disclosure.

FIG. 15 illustrates an example of timing of signaling for triggering DRS detection in accordance with various embodiments of the present disclosure. With reference to FIG. 15, the signaling triggering a DRS detection 1510 on the unlicensed band 1580 is received at time t1 1520 on a serving cell on licensed band 1570. It is beneficial if the network can assume that the UE begins DRS detection no later than a predetermined number of subframes or time (in milliseconds) 1540 after reception of signaling 1510 that triggers DRS detection. This allows the network to determine when to start transmission of DRS 1550 (e.g., on or after the UE starts to detect DRS). Note that a network entity may still transmit some signals 1530 prior to transmission of DRS for the purpose of channel reservation (i.e. reservation signal) but the UE may not be required to receive such signals.

Embodiments of the present disclosure recognize a need to define the signaling method that triggers DRS detection on a serving cell on an unlicensed band. In one example embodiment, assuming a cell on an unlicensed spectrum is configured as a SCell to the UE, the UE listens for and/or attempts to detect the DRS of the SCell when the SCell is activated. A SCell is considered activated (deactivated) by the UE upon reception of MAC activation (deactivation) command. The network may assume that all UEs begin DRS detection no later than 24 ms (or 34 ms, SCell activation latency requirements are further described in 3GPP TS 36.133 v12.7.0) upon reception of a MAC activation command. A shortened SCell activation maximum delay can be defined for SCell on an unlicensed spectrum to reduce the SCell activation latency, e.g., 5 or 6 ms.

In a second example embodiment, a UE can perform DRS detection on an unlicensed spectrum when a DL assignment that schedules a PDSCH, or an UL grant that schedules PUSCH, on the serving cell on an unlicensed spectrum is received on another serving cell on a licensed spectrum. For example, the DL assignment is carried by PDCCH/EPDCCH of DCI formats such as 1A, 2, 2A, 2B, 2C, 2D, whereby its CRC is scrambled with the UE's C-RNTI. The corresponding PDSCH can be scheduled at a later subframe than the PDCCH/EPDCCH subframe as illustrated in FIG. 14 and FIG. 15. The UL grant is carried by PDCCH/EPDCCH of DCI formats such as 0, 4, whereby its CRS is also scrambled with the UE's C-RNTI. The DCI formats can include a Carrier Indicator Field (CIF) to indicate that the serving cell on the unlicensed spectrum is the target cell for DL assignment. As DL assignments and UL grants are UE-specific and can be transmitted in different subframes for different UEs or different group of UEs, multiple DRS occasions, each for different UEs or different group of UEs, can be transmitted. To enable scheduling of PDCCH/EPDCCH in PRBs overlapping with PRBs for DRS, additional information about the presence of DRS (PSS, SSS, CRS, CSI-RS) can be included in the DCI (e.g., represented by 1 bit) primarily for PDSCH/EPDCCH rate matching purpose. The UE can also utilize the additional DRS for synchronization and measurements.

In a third example embodiment, the signaling to trigger DRS detection on an unlicensed spectrum is broadcasted or groupcasted to UEs with L1 signaling, e.g., a common PDCCH using DCI format such as DCI format 1C/3/3A or a new common DCI format can be used. The CRC of the PDCCH/EPDCCH can be scrambled with a new RNTI configured to UEs that are configured with the LTE carrier on an unlicensed spectrum (RNTI value is common for multiple or all UEs). The DCI format can carry only a single bit or multiple bits, where each bit corresponds to a cell on the unlicensed spectrum and indicates whether the UE should perform DRS detection for the cell. Upon reception of the L1 signaling in subframe n, the UE can start DRS detection in subframe n+k, where k>0, e.g., 1 ms, 2 ms, 3 ms, or 4 ms. Alternatively, the DCI triggering DRS detection can be transmitted in more than one subframes, in order to improve reliability and to enable its reception by UEs configured with DRX cycles that may not always have its active time coinciding with one or more of the DCI signalings. A timer information (e.g., with 2 bits) can be included in the DCI format to indicate the number of subframes after which the UE should detect/measure DRS.

In yet another example embodiment, the signaling to trigger DRS detection is RRC signaling, e.g., configuration of DRS detection/measurement by RRC. A shortened RRC configuration delay can be defined for a cell on an unlicensed spectrum. In another example embodiment, the signaling to trigger DRS detection is based on DRX cycle configuration (can be based on DRX configurations supported in Rel-8-12 LTE), e.g., the UE listens for and/or attempts to detect the DRS during the active time of the DRX cycle. To minimize or reduce impact of DRX configuration of a serving cell on an unlicensed spectrum to another serving cell in terms of scheduling, the DRX configuration of the serving cell on the unlicensed spectrum can be decoupled or independent from the DRX configuration for another serving cell.

After the end of a transmission period for a cell on an unlicensed spectrum, a UE can stop PDCCH/EPDCCH/PDSCH reception and reception of other physical signals. Embodiments of the present disclosure recognize a need to specify a method for the UE to determine the end of a current transmission period (P-ON). For example, P-ON can be a multiple of 10 ms that is not predetermined in the system operation. P-ON can also be less than 10 ms, or that P-ON mod 10 ms can be less than 10 ms. In a one example embodiment, assuming a cell on an unlicensed spectrum is configured as a SCell to the UE, the UE determines that the current transmission period has ended for the SCell on the unlicensed spectrum when the SCell is deactivated by the network e.g., using a MAC deactivation command. A shortened SCell deactivation maximum delay can be defined for SCell on an unlicensed spectrum to reduce the SCell deactivation latency, e.g., 2 ms or 3 ms or 4 ms.

In a second example embodiment, the UE determines that the current transmission period has ended for a cell on an unlicensed spectrum when the UE determines that the CRS is no longer transmitted by the eNB (e.g., CRS is not present in the first OFDM symbol or the control region of a subframe). After the end of a transmission period for a cell, the UE can resume DRS detection for the cell or monitor signaling from another serving cell that triggers DRS detection as described previously. An example UE procedure with this second example embodiment is illustrated in FIG. 16.

Figure 16:
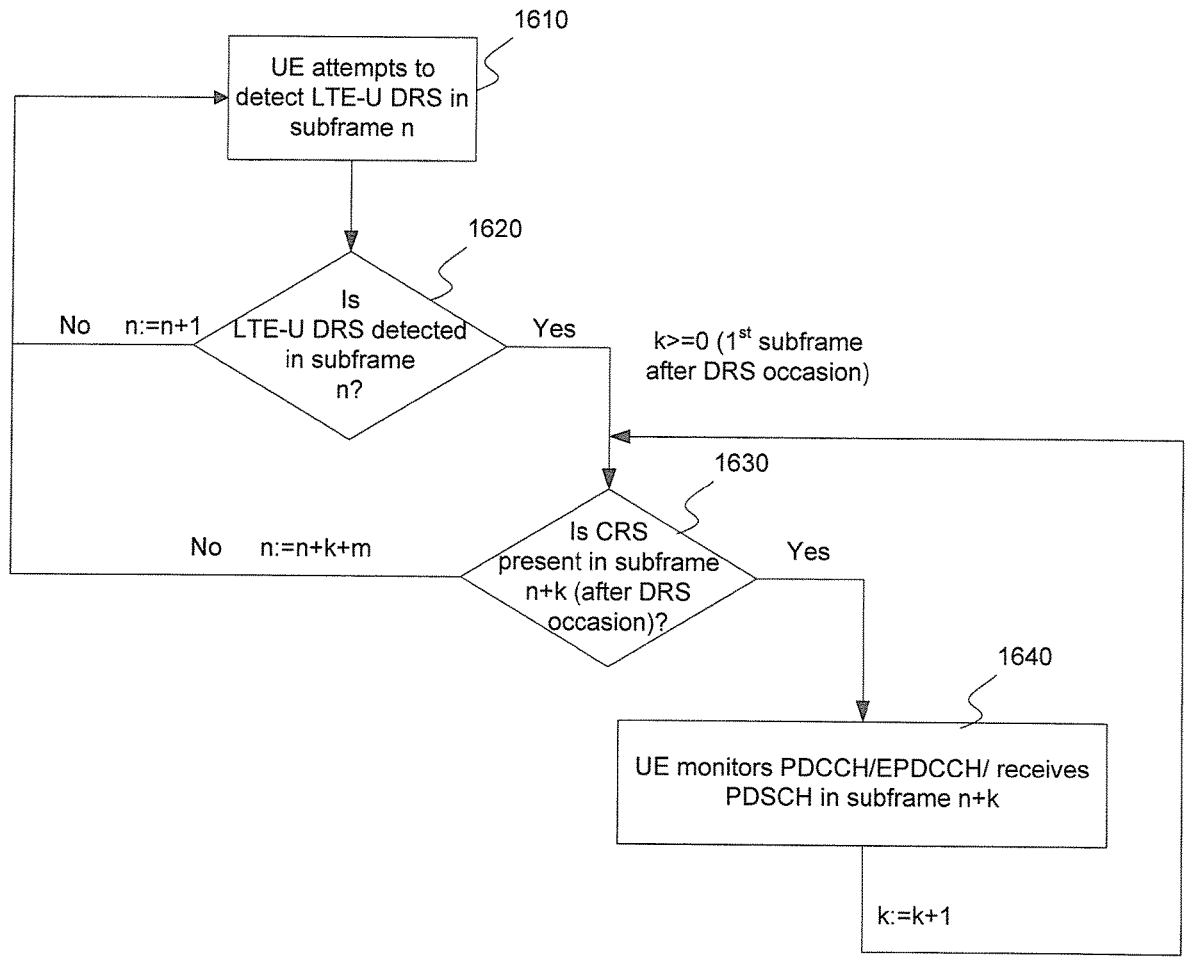
FIG. 16 illustrates a flowchart for an example process for transmission period determination in accordance with various embodiments of the present disclosure.

FIG. 16 illustrates a flowchart for an example process for transmission period determination in accordance with various embodiments of the present disclosure. For example, the process illustrated in FIG. 16 may be implemented by the UE 116. In this illustrative embodiment, the UE listens for and/or attempts to detect DRS in subframe n for a cell on an unlicensed spectrum (1610). If DRS of the cell is detected in subframe n 1620, the UE detects if CRS is present in the first subframe after DRS occasion (subframe n+k) (1630). If CRS is not present, the UE resumes DRS detection for the cell in a later time (m>0) (1610). Otherwise, if CRS is present, the UE attempts to receive PDCCH/EPDCCH or PDSCH in subframe n+k (1640). The process of CRS detection is then repeated in subframe n+k+1. In another example, if CRS is not present in every subframe of a P-ON transmission instance (e.g., if CRS is not used as a demodulation RS for control or data channels, and only DM-RS is used), CRS may still be present periodically (e.g., every 5 ms) for the UE to maintain time-frequency synchronization, the absence of CRS in the predetermined or configured subframe indicates that the current transmission period has already ended.

In a third example embodiment for determining the end of the current transmission period, the end of the current transmission instance can be broadcasted or groupcasted to UEs with L1 signaling, e.g., a common PDCCH using DCI format such as DCI format 1C/3/3A or a new common DCI format can be used. The DCI format can carry only a single bit or multiple bits, where each bit corresponds to a cell on the unlicensed spectrum and it indicates whether the UE should stop reception from the cell. The DCI format can be the same as the DCI format for triggering DRS detection as described before, e.g., bit 1 can indicate the cell is transmitting or has begun transmissions or will begin transmissions in a predetermined or configured time; and bit 0 can indicate the cell is not transmitting or has stopped transmission or will stop transmissions in a predetermined or configured time.

Above discussed embodiments describe a LTE cell on unlicensed band that is configured as a serving cell. It is also beneficial for the UE to detect and measure the DRS transmitted by LTE cells on unlicensed band that is not configured as a serving cell and provide the measurement report to the network so that the cell signal quality can be evaluated by the network. The non-serving cells can be on the same carrier frequency or different carrier frequency than a serving cell. For the non-serving cells that are on the same frequency as a serving cell, the UE can also perform DRS detection/measurement for the non-serving cells concurrently when the UE is receiving signals from the serving cell. Measurement period configuration can also be configured by the network for this purpose, e.g., a Discovery reference signal Measurement Timing Configuration (DMTC), which is a periodically occurring DRS detection/measurement gap, can be configured. Gap duration can be predefined or configurable, e.g., 6 ms, 12 ms, 24 ms and others. DMTC periodicity can be 20 ms, 40 ms, 80 ms, 160 ms and others. DRS can be transmitted at any time within the DMTC duration (e.g., as discussed below with regard to FIG. 17). This can be beneficial if the serving cell does not have a high activity level and measurement reports are still needed by the network. DMTC can also be configured for measurement of serving cell as well, in which case DMTC can be considered signaling to trigger DRS detection/measurement for the serving cell. Finally, DMTC can also be configured for measurement of non-serving cells on different frequency than the serving cell (inter-frequency measurement).

For the purpose of RRM measurement, synchronization maintenance and AGC tracking, for both serving and non-serving cells, DRS transmission can also be transmitted by the network in a periodic manner, without performing CCA first. This is allowed e.g., by the European regulation as Short Control Signaling Transmissions (e.g., as further described in ETSI EN 301 893 V1.7.1), where signals with a maximum duty cycle of 5% within an observation period of 50 ms can be transmitted without CAA. The following configurations of DRS occasions are allowed without CCA: (i) DRS transmission periodicity of 40 ms with DRS occasion of duration 1 ms or 2 ms, (ii) DRS transmission periodicity of 80 ms with DRS occasion of duration 1 ms to 4 ms, (iii) DRS transmission periodicity of 160 ms with DRS occasion of duration 1 ms to 8 ms, and (iv) DRS transmission periodicity of 20 ms with DRS occasion of duration 1 ms. The resource elements not mapped to the PSS/SSS/CRS/

CSI-RS can be transmitted with any signal that meet the regulatory requirements or can be used to transmit control or broadcast messages.

The embodiment can be modified for the case where restrictions on when a P-ON instance can occur is applied. One example of such restriction can be that P-ON can only start in the first subframe of a frame (subframe 0), or in the first subframe of every few frames, where the number of frames can be predefined or configurable by the network (e.g., via RRC). If the channel is not available for the LTE cell in the first subframe of a frame possible for transmission, the LTE cell has to wait until the next frame or the next configured frame to try to access the channel again. The UE can also only try to detect the DRS from the LTE cell in the first subframe of a frame or a configured frame. If there is signaling from another serving cell triggering the DRS detection or signal reception, the UE starts DRS detection or signal reception at the first available subframe 0. The number of subframes in a frame or the frame length can also be predefined or configured by the network (e.g., via RRC). For example, the number of subframes in a frame can be configured between 4 ms (which can meet regulatory requirement in Japan) and 10 ms (which can meet the regulatory requirement in Europe). The configuration can be region-specific. Other configurable values can be used, e.g., from 4 ms to 10 ms.

The above discussed principles can also be applied if DRS occasion is replaced with other types of synchronization or cell detection signals, e.g., CRS only, or CRS and CSI-RS, PSS and SSS, or PSS, SSS and CRS, or a new discovery or synchronization signal, such as those described in U.S. Provisional Applications 62/074,54; 62/086,018; 62/092,120; 62/131,687; and 62/134,386.

In various embodiments of the present disclosure, a UE can be configured with periodically occurring DRS detection/measurement gap of T ms (e.g., T=6 ms, 12 ms, 24 ms, or configurable by the network, e.g., according to the interference/traffic congestion level on the carrier (T is longer for more congested carrier/for carrier with higher interference level)) for a cell on an unlicensed spectrum. The periodicity of DRS detection/measurement can be fixed or configurable by the network, e.g., 20 ms, 40 ms, 80 ms, 160 ms. A DRS occasion can be transmitted by a cell at any time within a DRS detection/measurement gap (including any time positions within a set of predetermined/network configured (e.g., by RRC signaling) time positions within the DRS detection/measurement gap) and can be different for each DRS detection/measurement gap depending on whether the channel can be determined by the cell to be idle or free from interference (i.e. pass CCA). Note that the PSS/SSS of DRS do not need to be restricted to the same fixed set of subframes as that for the PSS/SSS in Rel-12 (e.g., subframe 0 or subframe 5 for FDD). If the channel is not free for the entire DRS detection/measurement gap, the DRS may not be transmitted and the cell has to wait for the next DRS detection/measurement gap to try to transmit DRS. In another example, the DRS can be forced to be transmitted in the last subframe of the DRS detection/measurement gap even though CCA is not passed, if the channel/carrier was not free before within the same DRS detection/measurement gap; this ensures there will be at least one DRS for approximately every DRS detection/measurement gap periodicity. The configuration of periodically occurring DRS detection/measurement gap is referred to as DRS Measurement Timing Configuration (DMTC).

Figure 17A:
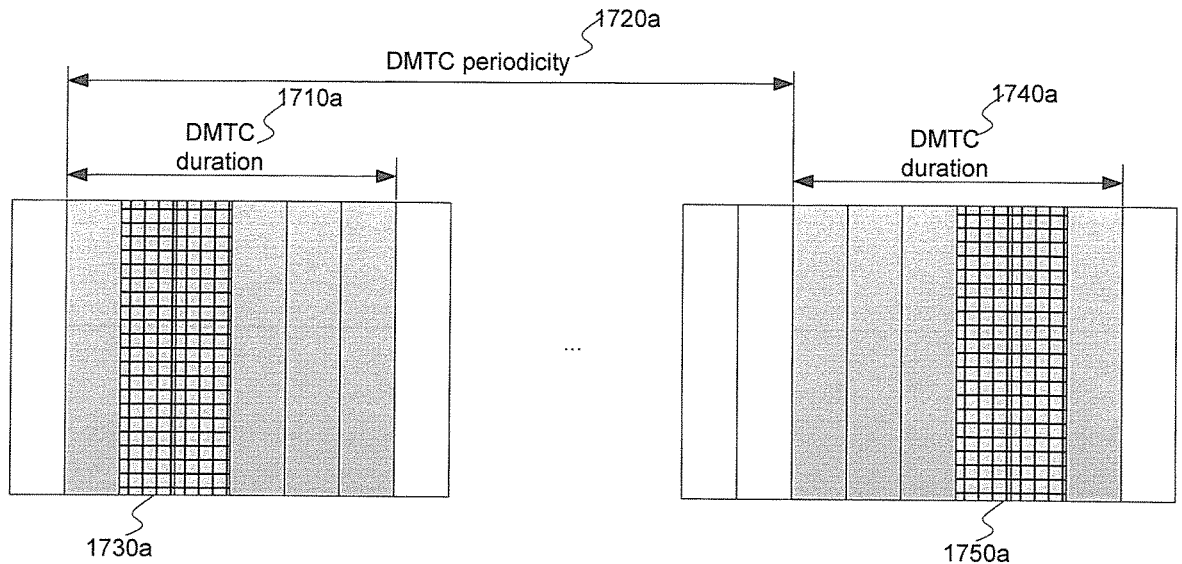
FIGS. 17A and 17B illustrate examples of discovery reference signal measurement timing configurations and discovery reference signal occasions in accordance with various embodiments of the present disclosure.
Figure 17B:
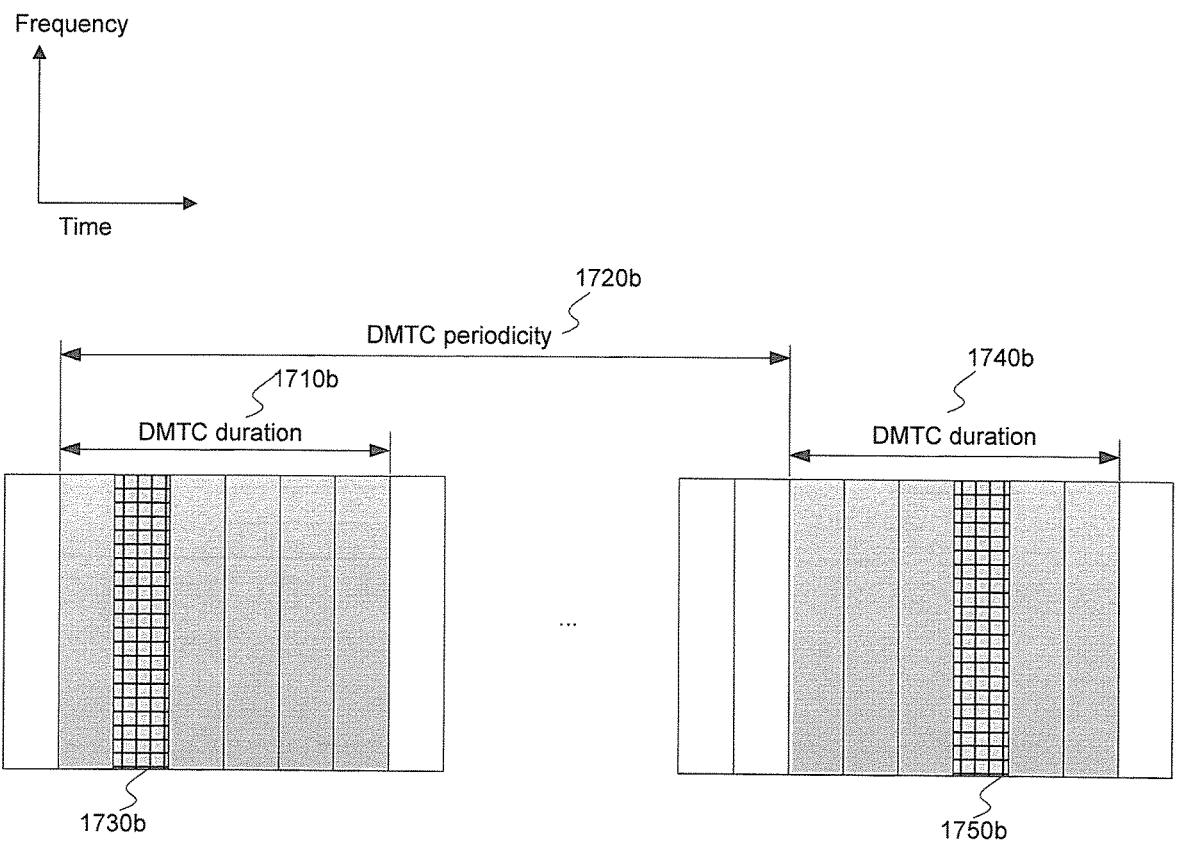

FIGS. 17A and 17B illustrate examples of DMTCs and DRS occasions transmitted within the DMTCs in accordance with various embodiments of the present disclosure. FIG. 17A illustrates an example with two subframe DRS occasions 1730a and 1750a and FIG. 17B illustrates an example with one subframe DRS occasions 1730b and 1750b. In these example embodiments, periodic DMTC durations 1710a&b (e.g., 6 ms) with a DRS occasion durations 1730a&b (e.g., 2 ms in FIG. 17A or 1 ms in FIG. 17B) are depicted.

Referring to FIG. 17A, in a first DMTC duration 1710a, DRS occasion 1730a is transmitted in the second and the third subframes because, in this illustrative example, the channel/carrier is considered occupied for the first subframe (e.g., the CCA slot immediately before the first subframe is not idle), whereas in a second DMTC duration 1740a, DRS occasion 1750a is transmitted in the fourth and the fifth subframes because, in this illustrative example, the channel/carrier is considered occupied for the first, the second and the third subframes (e.g., the CCA slots immediately before the first, the second and the third subframes are not idle).

Referring to FIG. 17B, in a first DMTC duration 1710b, DRS occasion 1730b is transmitted in the second subframe because, in this illustrative example, the channel/carrier is considered occupied for the first subframe (e.g., the CCA slot immediately before the first subframe is not idle), whereas in a second DMTC duration 1740b, DRS occasion 1750b is transmitted in the fourth subframe because, in this illustrative example, the channel/carrier is considered occupied for the first, the second and the third subframes (e.g., the CCA slots immediately before the first, the second and the third subframes are not idle).

Subframes where a DRS occasion is transmitted can depend on whether the unlicensed spectrum is free of other intra-cell interference during the subframes. The purposes/functions of DRS and DRS occasion can be as described above and illustrated, for example, in FIGS. 9A, 9B, 10A, and 10B. Reservation signal can be transmitted prior to the DRS occasion transmission for the purpose of channel reservation after the eNB has fulfilled the CCA requirement (not shown in FIGS. 17A and 17B for simplicity).

The principles described here can also be applied if DRS occasion is replaced with other types of synchronization or cell detection signals, e.g., CRS only, or CRS and CSI-RS, or a new discovery or synchronization signal, such as those described in REFS.

Similar to as described above, for the purpose of RRM measurement, synchronization maintenance and AGC tracking, for both serving and non-serving cells, DRS transmission can also be transmitted by the network in a periodic and deterministic manner, without performing CCA first. This is allowed e.g., by the European regulation as Short Control Signaling Transmissions (e.g., as further described in ETSI EN 301 893 V1.7.1), where signals with a maximum duty cycle of 5% within an observation period of 50 ms can be transmitted without CAA. The following example configurations of DRS occasions are allowed without CCA: (i) DRS transmission periodicity of 40 ms with DRS occasion of duration 1 ms or 2 ms, (ii) DRS transmission periodicity of 80 ms with DRS occasion of duration 1 ms to 4 ms, (iii) DRS transmission periodicity of 160 ms with DRS occasion of duration 1 ms to 8 ms, and (iv) DRS transmission periodicity of 20 ms with DRS occasion of duration 1 ms. The resource elements not mapped to the PSS/SSS/CRS/CSI-RS can be transmitted with any signal that meet the regulatory requirements or can be used to transmit control or broadcast messages.

PDCCH/EPDCCH/PDSCH may not necessarily follow DRS occasion transmission. Embodiments of the present disclosure recognize a need for a method for a UE to detect the PDCCH/EPDCCH/PDSCH transmission of a LTE cell on an unlicensed spectrum.

In one embodiment, the UE determines whether there is transmission or pending transmission of PDCCH/EPDCCH/PDSCH from a LTE cell on an unlicensed spectrum by detecting the presence of CRS of the LTE cell (e.g., CRS is scrambled by the PCID of the cell) on the unlicensed spectrum. The start of CRS transmission can occur in any subframe from the UE's perspective. CSI-RS can also be used by the UE if it is configured. CRS (and CSI-RS if configured) can be transmitted in one or several subframes or slots (e.g., 1 ms, 2 ms, 3 ms or 4 ms) before or along in the first subframe of the transmissions of PDCCH/EPDCCH/PDSCH. The detection of CRS can be limited to the first OFDM symbol of a subframe for CRS port 0 and CRS port 1 (if configured) or the first two OFDM symbols of a subframe for CRS port 0 and CRS port 1, 2, 3 (if configured), when the subframe can be a MBSFN subframe or when whether a subframe is a MBSFN subframe or not is not known to the UE.

Figure 18:
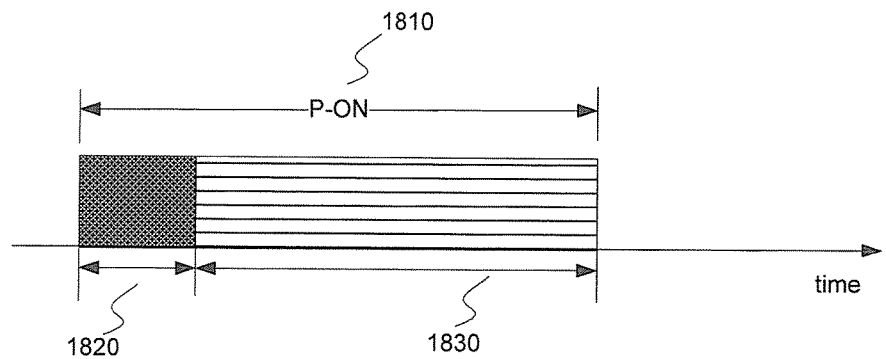
FIG. 18 illustrates an example LAA/LTE-U carrier with CRS transmission preceding downlink transmissions in accordance with various embodiments of the present disclosure.

FIG. 18 illustrates an example LAA/LTE-U carrier with CRS transmission preceding downlink transmissions in accordance with various embodiments of the present disclosure. Reservation signal can be transmitted prior to the CRS subframe transmission for the purpose of channel reservation after the eNB has fulfilled the CCA requirement (not shown in FIG. 18 for simplicity). Referring to FIG. 18, a UE may only be required to receive CRS (and CSI-RS if configured) in the first or the first few subframes 1820 for fine synchronization and AGC tracking and may not be required to receive downlink transmissions (e.g., PDCCH/EPDCCH/PDSCH) in those subframes. PDCCH/EPDCCH/PDSCH can be transmitted after the CRS-only subframes (that do not include control or data information) as indicated in 1830. Note that CRS can still be present in the subframes used for PDCCH/EPDCCH/PDSCH transmissions as demodulation RS. However, if CRS is not used as demodulation RS, the CRS may not be present in every subframe used for PDCCH/EPDCCH/PDSCH transmissions. In this case, CRS can still be present with a predetermined or configured periodicity (e.g., 5 ms) for maintaining time-frequency synchronization and AGC tracking. In the subframes where the UE is only expected to receive CRS (and CSI-RS), signals can also be transmitted in the other REs in order to reserve the wireless channel, where the signals may not be standardized (up to network implementation).

In another example, the UE can receive PDCCH/EPDCCH/PDSCH from the first subframe where CRS is detected, which is feasible assuming (coarse) synchronization is already achieved by the UE (e.g., using the discovery signal transmitted within DMTC, and the CRS can be used for fine synchronization and for maintaining synchronization tracking). In this case, PDCCH/EPDCCH/PDSCH can also be transmitted by the network and received by the UE in 1820. When DL cross-scheduling is configured, e.g., the PDSCH on the unlicensed carrier is scheduled from another serving cell, or is self-scheduled using EPDCCH, the PDSCH can also start from the first OFDM symbol of the subframe (e.g., there is no control region for PDCCH). If the PDSCH/EPDCCH only starts at a later symbol (e.g., from $3^{rd}$ or $4^{th}$ OFDM symbol), then the network can also transmit non-standard signals in the first set of OFDM symbols (in REs not already used for other purposes such as CRS) in order to reserve the channel. It is also possible for DMTC or DRS occasion to overlap or partially overlap with the CRS/PDCCH/EPDCCH/PDSCH transmissions (or DL control/data transmission burst). In case of such overlapping or partially overlapping transmissions and assuming CCA is required for DRS transmission, it can be beneficial for the cell to transmit DRS occasion at a first available opportunity, e.g., the first subframe of DMTC or the first few subframes of DMTC in case of DRS occasion duration of more than one subframe, or at a predetermined or configured (e.g. by RRC signaling) or default time location. Since control or data transmission is on-going, there is no need for the cell to contend for the wireless channel for DRS transmission. The location of DRS is effectively deterministic and the UE does not need to perform blind detection for the DRS within the DMTC as in the case when the DRS and PDCCH/EPDCCH/PDSCH transmissions do not overlap. This also simplifies UE's operation of determining of PDCCH/EPDCCH/PDSCH RE mapping. The ON transmission period of the LTE cell can also be minimized or reduced with this approach. Alternatively, when the transmissions overlap, the LTE cell does not transmit DRS occasion and the UE uses the CRS (and CSI-RS if configured) for maintaining time-frequency synchronization, AGC tracking, RRM/CSI measurement and determination of PDCCH/EPDCCH/PDSCH RE mapping. In another alternative, when the transmissions overlap, the LTE cell transmits DRS occasions in every (configured) transmission opportunity of the overlapping duration of DMTC and the DL control/data transmission bust, and the UE uses the PSS/SSS/CRS (and CSI-RS if configured) for maintaining time-frequency synchronization, AGC tracking, RRM/CSI measurement and determination of PDCCH/EPDCCH/PDSCH RE mapping. In another alternative, when the transmissions overlap, the LTE cell transmits DRS occasion in the first (configured) transmission opportunity of the overlapping duration of DMTC and the DL control/data transmission burst (which may not be the same as the first (configured) transmission opportunity of the DMTC), and the UE uses the PSS/SSS/CRS (and CSI-RS if configured) for maintaining time-frequency synchronization, AGC tracking, RRM/CSI measurement and determination of PDCCH/EPDCCH/PDSCH RE mapping. In another alternative, the presence of DRS can be indicated to be UE for one or more subframes within the DL control/data transmission burst, e.g., in a (dynamic) UE-common signaling or a UE-specific signaling (such as DCI format for DL assignment), and the UE uses the PSS/SSS/CRS (and CSI-RS if configured) (if indicated) for maintaining time-frequency synchronization, AGC tracking, RRM/CSI measurement and determination of PDCCH/EPDCCH/PDSCH RE mapping.

Figure 19:
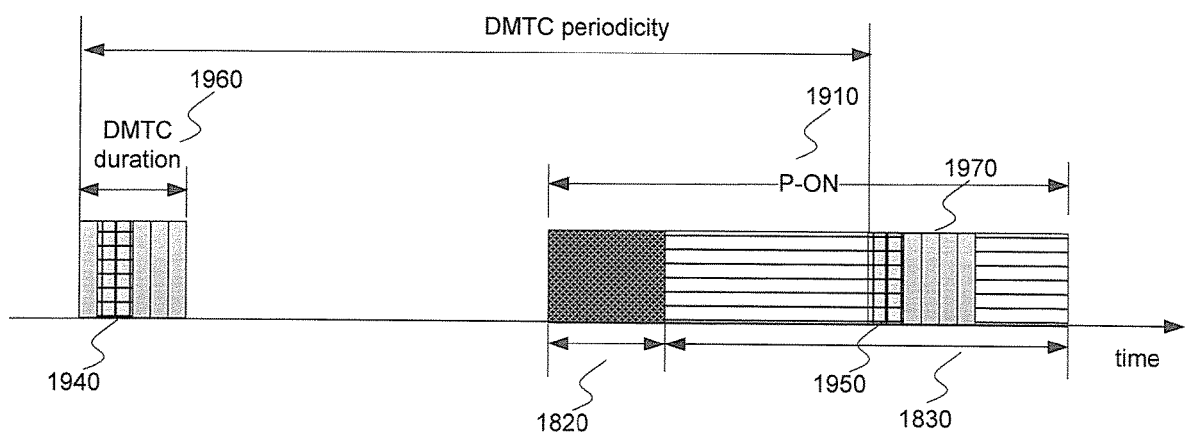
FIG. 19 illustrates an example of overlapping DMTC and downlink transmissions in accordance with various embodiments of the present disclosure.

FIG. 19 illustrates an example of overlapping DMTC and downlink transmissions (e.g., PDCCH/EPDCCH/PDSCH transmission) in accordance with various embodiments of the present disclosure. With reference to FIG. 19, a first DMTC 1960 does not overlap with a P-ON instance and the corresponding DRS 1940 is transmitted within the DMTC 1960 when the channel is deemed available by the network; in this case it is the second and the third subframe of the DMTC duration 1960. However, a second DMTC 1970 overlaps with a P-ON instance 1910. As the channel is already reserved by the cell, the DRS 1950 is transmitted from the first subframes of DMTC 1970.

Similarly, a UE determines the end of PDCCH/EPDCCH/PDSCH transmission for a cell on an unlicensed spectrum by detecting the absence of CRS in a subframe (e.g., CRS is not present in the first OFDM symbol or the control region of a subframe). In another embodiment, if CRS is not present in every subframe of a P-ON transmission instance (e.g., if CRS is not used as a demodulation RS for control or data channels, and only DM-RS is used), CRS may still be present periodically (e.g., every 5 ms) for the UE to maintain time-frequency synchronization, the absence of CRS in the predetermined or configured subframe indicates that the current transmission period has already ended.

For UE power saving purposes, DRX cycle as in the Rel-8-12 LTE can be configured (e.g., as further described in 3GPP TS 36.331 v12.2.0) and the UE's detection of CRS (and CSI-RS) may only be required during the active time of the DRX cycle. The DRX configuration for a cell on an unlicensed spectrum can be independent from the DRX configuration for another serving cell. Other methods to trigger for CRS detection by the UE thereby save UE signal processing and power consumption by avoid CRS detection in every subframes, can be the same or similar to the example embodiments discussed above. These example embodiments may not be applicable to DRS detection in DMTC, e.g., the UE can still be required to detect DRS according to DMTC if configured.

A UE can be expected to maintain a level of synchronization using the detected DRS and then using the CRS in PDCCH/EPDCCH/PDSCH transmission subframes for fine synchronization. If the UE misses a DRS detection or if the network was not able to transmit DRS in the last DMTC period due to network congestion or interference, then the UE may not be able to directly obtain synchronization using the CRS. It can be beneficial to specify that if DRS detection/reception is missed in the most recent or the last few DMTC instances (e.g., 2 or 3 instances), then the UE is not required to detect CRS for receiving incoming PDCCH/EPDCCH/PDSCH transmissions. Other similar conditions can also be applied, e.g., if a UE misses DRS detection/reception for Y ms, (e.g., Y can be 200 ms or other values) on a carrier, then the UE is not required to perform PDCCH/EPDCCH/PDSCH reception of the carrier. In another example, if there is another carrier configured to the UE that is sufficiently synchronized with the carrier (and the network can ensure this), then the UE can utilize the DRS of the other synchronized carrier for CRS/PDCCH/EPDCCH/PDSCH reception for the carrier. The condition for skipping CRS/PDCCH/EPDCCH/PDSCH reception can then be expanded to include DRS detection status from all synchronized carriers, e.g., if DRS detection/reception has been missed for Y ms, (e.g., Y can be 200 ms or other values) for all synchronized carriers, then the UE is not required to perform PDCCH/EPDCCH/PDSCH reception of all synchronized carriers. Network signaling of which carriers can be assumed to be synchronized by the UE can be beneficial. In another alternative, the UE may not skip CRS detection or PDCCH/EPDCCH/PDSCH reception, but the network would assign a low MCS (e.g., with QPSK and low code rate) for PDCCH/EPDCCH/PDSCH transmission to increase the chance of successful PDCCH/EPDCCH/PDSCH decoding by the UE.

These example embodiments can be modified for the case where restrictions on when a P-ON instance can occur is applied. One example of such restriction can be that P-ON can only start in the first subframe of a frame (subframe 0), or in the first subframe of every few frames, where the number of frames can be predefined or configurable by the network (e.g., via RRC). If the channel is not available for the LTE cell in the first subframe of a frame possible for transmission, the LTE cell has to wait until the next frame or the next configured frame to try to access the channel again. The UE can also only try to detect the CRS from the LTE cell in the first subframe of a frame or a configured frame. If there is signaling from another serving cell triggering the CRS detection or signal reception, the UE starts CRS detection or signal reception at the first available subframe 0. The number of subframes in a frame or the frame length can also be predefined or configured by the network (e.g., via RRC). For example, the number of subframes in a frame can be configured between 4 ms (which can meet regulatory requirement in Japan) and 10 ms (which can meet the regulatory requirement in Europe). The configuration can be region-specific. Other configurable values are not precluded, e.g., from 4 ms to 10 ms.

In Rel-8-12 (3GPP TS 36.211 v12.2.0), the sequence d(0), . . . , d(61) used for the second synchronization signal (SSS) is an interleaved concatenation of two length-31 binary sequences. The concatenated sequence is scrambled with a scrambling sequence given by the primary synchronization signal. The combination of two length-31 sequences defining the secondary synchronization signal differs between subframe 0 and subframe 5 according to:

$$d(2n) = \begin{cases} s_0^{(m_0)}(n)c_0(n) & \text{in subframe 0;} \quad (Eq\_S0) \\ s_1^{(m_1)}(n)c_0(n) & \text{in subframe 5;} \quad (Eq\_S5) \end{cases}$$

$$d(2n+1) = \begin{cases} s_1^{(m_1)}(n)c_1(n)z_1^{(m_0)}(n) & \text{in subframe 0;} \quad (Eq\_S0) \\ s_0^{(m_0)}(n)c_1(n)z_1^{(m_1)}(n) & \text{in subframe 5;} \quad (Eq\_S5) \end{cases}$$

where $0 \leq n \leq 30$. The detailed definitions for $s_0^{(m_0)}$, $s_1^{(m_1)}(n)$, $c_0(n)$, $c_1(n)$, $z_1^{(m_0)}$, $z_1^{(m_1)}(n)$ can be found in 3GPP TS 36.211 v12.2.0 and are omitted here for brevity. When the SSS of DRS can be transmitted in subframes other than subframe 0 and subframe 5, embodiments of the present disclosure recognize a need to modify the SSS sequence generation operation as defined in 3GPP TS 36.211 v12.2.0.

In one example embodiment, any LAA SSS transmitted in a predetermined first set of subframes uses the sequence as defined by Eq_S0 (e.g., the same sequence as the legacy SSS for subframe 0); whereas any LAA SSS transmitted in a predetermined second set of subframes uses the sequence as defined by Eq_S5 (e.g., same sequence as the legacy SSS for subframe 5). The definitions of the first and the second sets of subframes can be predefined/fixed in the standards or can be configured by the network. Other definitions for Eq_S0 and Eq_S5 are also possible without departing from the principles of the present disclosure. Each subframe set can comprise of a same number of subframes.

Figure 20:
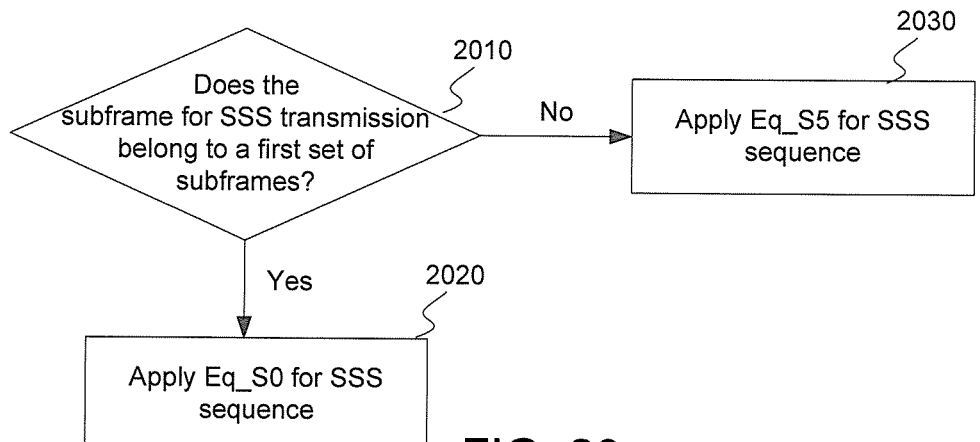
FIG. 20 illustrates a flowchart for an example process for determining an SSS sequence in accordance with various embodiments of the present disclosure.

FIG. 20 illustrates a flowchart for an example process for determining an SSS sequence in accordance with various embodiments of the present disclosure. For example, the process illustrated in FIG. 20 may be implemented by the UE 116. In this illustrative embodiment, the UE determines whether the subframe for an SSS transmission belong to a first set of subframes or a second set of subframes (2010). For example, the UE may determine the subframe set in which the SSS is received. When within a first set of subframes, the UE determines to apply Eq_S0 for the SSS sequence (2020). When within a second set of subframes, the UE determines to apply Eq_S5 for the SSS sequence (2030).

Figure 21:
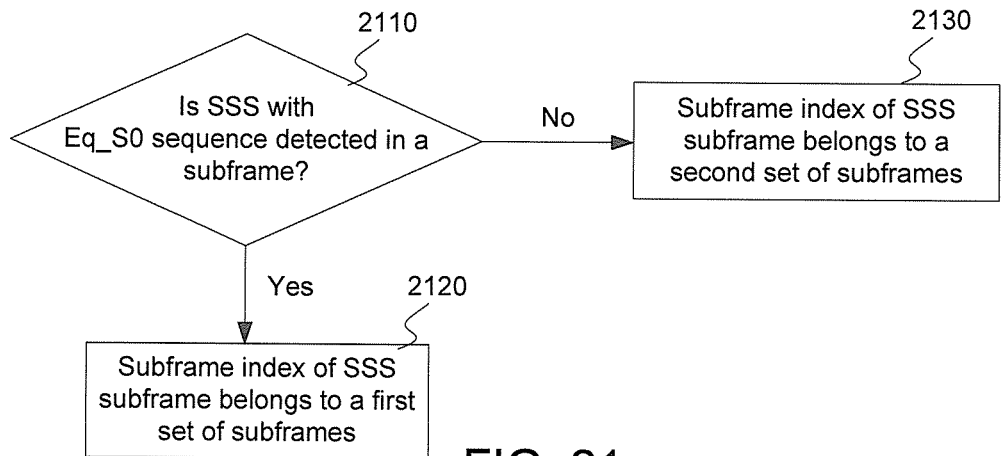
FIG. 21 illustrates a flowchart for an example process for determining a possible subframe index from a detected SSS sequence in accordance with various embodiments of the present disclosure.

FIG. 21 illustrates a flowchart for an example process for determining a possible subframe index from a detected SSS sequence in accordance with various embodiments of the present disclosure. For example, the process illustrated in FIG. 21 may be implemented by the UE 116. In this illustrative embodiment, when the UE (or any device receiving LAA SSS or LAA DRS) detects a LAA SSS of a non-serving cell with the sequence as defined by Eq_S0 and Eq_S5 (2110), the UE can deduce that the subframe in which the SSS is detected belongs to the first set of subframes and the second set of subframes, respectively (2120 and 2130). In addition, since subframe indexing is periodic with 10 ms periodicity, the UE can also assume that the LAA SSS to be detected for the same cell in a subframe which is an integer multiple of frame (10 ms) relative to the subframe of the detected LAA SSS also uses the same sequence.

In one example, each subframe set comprises of a single time contiguous subframes, e.g., when the LAA SSS is transmitted in any subframe between subframe 0 and subframe 4 (inclusive), the sequence Eq_S0 is applied, else the sequence for Eq_S5 is applied.

In another example, the subframes for the first set and the second set can be interleaved e.g., when the LAA SSS is transmitted in any subframe with subframe index belonging to {0, 2, 4, 6, 8}, the sequence Eq_S0 is applied, else when the LAA SSS is transmitted in any subframe with subframe index belonging to {1, 3, 5, 7, 9}, the sequence for Eq_S5 is applied. An advantage of this example is that after a LAA SSS is detected, the sequence of next/future LAA SSS transmission becomes deterministic given the subframe offset between the detected LAA SSS and the LAA SSS to be detected, which can simplify SSS detection operation.

There can also be a subset of subframes where the LAA SSS can be transmitted or assumed for possible transmissions. For example, when the LAA SSS is transmitted in any subframe with subframe index belonging to {0, 2, 4}, the sequence Eq_S0 is applied, else when the LAA SSS is transmitted in any subframe with subframe index belonging to {5, 7, 9}, the sequence for Eq_S5 is applied. In this example, subframe 1, 3, 6, 8 are not used for LAA SSS transmissions. Other examples of first and second subframe sets can be constructed without departing from the principles of the present disclosure.

In another example embodiment, the LAA SSS sequence does not depend on the transmission subframe. For example, Eq_S0 is always used as the sequence regardless of the subframe index of SSS transmission. An advantage of this example embodiment is the simplification of SSS blind detection as dependency on subframe index may be eliminated.

In Rel-8-12 (e.g., 3GPP TS 36.211 v12.2.0), the CRS sequence $r_{l,n_s}(m)$ is defined by:

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max,DL} - 1$$

where $n_s$ is the slot number within a radio frame and l is the OFDM symbol number within the slot. The pseudo-random sequence c(i) is defined in clause 7.2 of REF 1. The definitions of other parameters can be found in REF 1. The pseudo-random sequence generator shall be initialized with $c_{init}=2^{10} \cdot (7 \cdot (n_s+1)+l+1) \cdot (2 \cdot N_{ID}^{cell}+1) + 2 \cdot N_{ID}^{cell} + N_{CP}$ at the start of each OFDM symbol where $$N_{CP} = \begin{cases} 1 & \text{for normal } CP \\ 0 & \text{for extended } CP \end{cases}.$$

When the SSS of DRS can be transmitted in subframes other than subframe 0 and subframe 5, and detection of sequence may not indicate unambiguously the subframe index of the detected SSS subframe (particularly for a non-serving cell), the UE (or other receiver devices) may not know immediately the $n_s$ value to assume to receive/detect CRS in an OFDM symbol of a given slot. Embodiments of the present disclosure recognize that methods are needed for the UE (or other receiver devices) to determine the $n_s$ value to facilitate the CRS sequence generation and CRS detection.

In a first example embodiment, subframe/slot indexing of LAA cell is according to the standard cell subframe/slot indexing (e.g., as in Rel-10-12) and the $n_s$ value used to generate CRS sequence for a slot is also according to the conventional cell's CRS sequence generation. For a serving LAA cell, the $n_s$ value used to generate the sequence of LAA CRS of DRS in an OFDM symbol can be directly known from the PCell timing, since the serving LAA cell subframe/slot timing is aligned with that of PCell (within ~31 µs timing offset). For a non-serving LAA cell, the UE can utilize the SSS sequence detection to determine the range of $n_s$ values which could be used for CRS sequence generation by the network.

Figure 22:
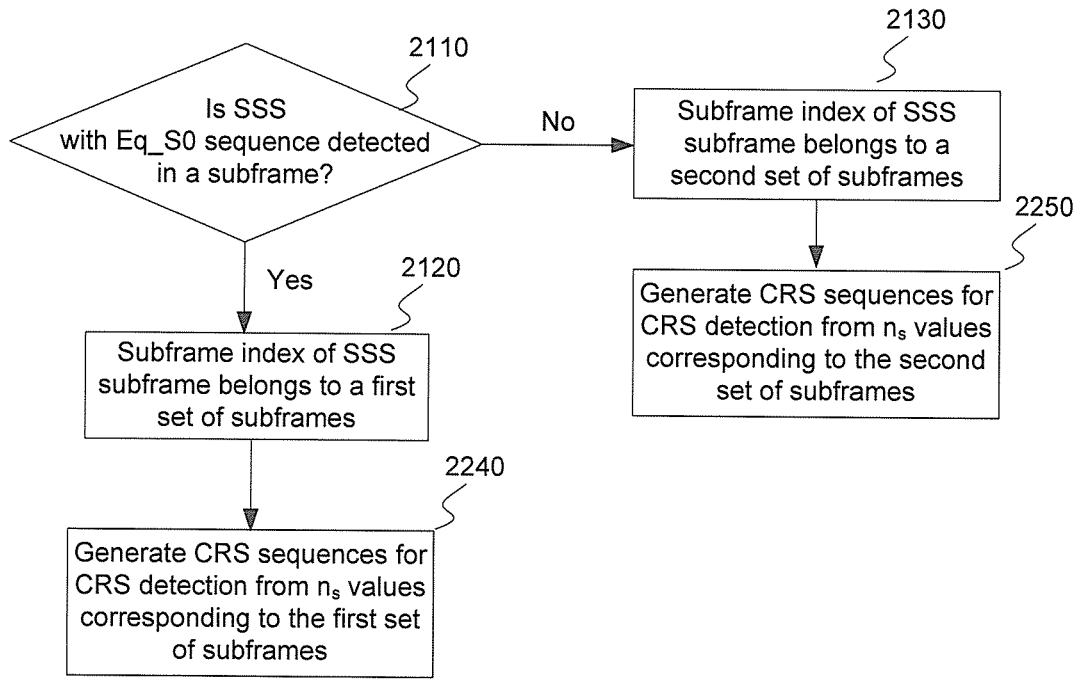
FIG. 22 illustrates a flowchart for an example process for determining possible values for CRS sequence generation for CRS detection in accordance with various embodiments of the present disclosure.

FIG. 22 illustrates a flowchart for an example process for determining possible $n_s$ values for CRS sequence generation for CRS detection in accordance with various embodiments of the present disclosure. For example, the process illustrated in FIG. 22 may be implemented by the UE 116. In this illustrative embodiment, the subframe index from a detected SSS sequence may be determined as discussed above with regard to FIG. 21. Further, if the SSS sequence detected corresponds to a predefined first set of subframes, the range of $n_s$ values that the UE can use to detect the CRS at least in the same subframe as that of the detected SSS also corresponds to the first set of subframes (2240). Otherwise, if the SSS sequence detected corresponds to a predefined second set of subframes, the range of $n_s$ values that the UE can use to detect the CRS at least in the same subframe as that of the detected SSS also corresponds to the second set of subframes (2250). The UE can attempt the possible $n_s$ values within the range detected for CRS detection in serial or in parallel. Successful detection of CRS enables the UE to determine the slot/subframe/frame timing of the LAA cell. After the slot/subframe/frame timing of the LAA cell is known, the UE can then utilize this knowledge to facilitate the next/future CRS detection, e.g., blind detection of $n_s$ from multiple possible values can be avoided.

In a second example embodiment, the $n_s$ value used to generate CRS sequence for DRS of a slot can be determined from the sequence of SSS transmitted in the same subframe. In one example, the $n_s$ value used to generate CRS sequence for DRS at least in the same subframe as that of a SSS is 0 in the first slot and 1 in the second slot of the subframe when the SSS sequence applied is Eq_S0. Similarly, the $n_s$ value used to generate CRS sequence for DRS at least in the same subframe as that of a SSS is 10 in the first slot and 11 in the second slot of the subframe when the SSS sequence applied is Eq_S5. An advantage of this method is that multiple trials of $n_s$ value in CRS detection is not needed, thus can simplify CRS detection operation.

In a third example embodiment, the $n_s$ value used to generate LAA CRS sequence for DRS of any slot is fixed to a constant. For example, $n_s=0$ is always used as the sequence regardless of the slot/subframe index of CRS transmission (this is equivalent to remove the parameter $n_s$ from the formula to determine $c_{init}$). In another example, $n_s=0$ is always used in the first slot and $n_s=1$ is always used in the second slot regardless of the slot/subframe index of CRS transmission. An advantage of this example embodiment the simplification of CRS blind detection as dependency on slot index may be eliminated.

In Rel-8-12 (REF 1), the CSI-RS sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ is the slot number within a radio frame and l is the OFDM symbol number within the slot. The pseudo-random sequence c(i) is defined in clause 7.2 of 3GPP TS 36.211 v12.2.0. The pseudo-random sequence generator is initialized with:

$$c_{init} = 2^{10} \cdot (7 \cdot (n_s+1)+l+1) \cdot (2 \cdot N_{ID}^{CSI}+1)+2 \cdot N_{ID}^{CSI}+N_{CP}$$

at the start of each OFDM symbol where $$N_{CP} = \begin{cases} 1 & \text{for normal } CP \\ 0 & \text{for extended } CP \end{cases}$$

and definitions of other parameters can be found in 3GPP TS 36.211 v12.2.0.

Figure 23:
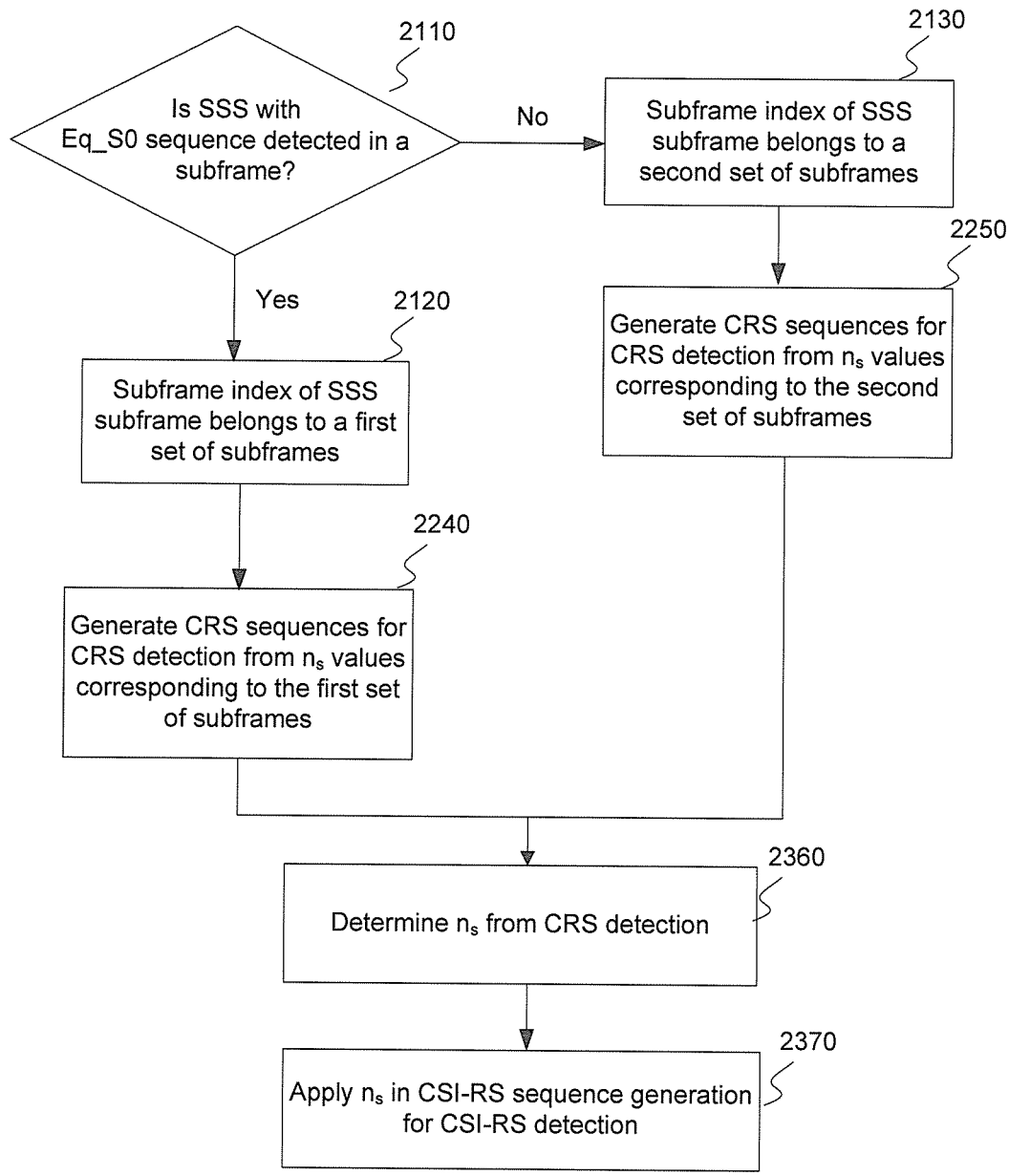
FIG. 23 illustrates a flowchart for an example process for determining an value for CSI-RS sequence generation for CSI-RS detection in accordance with various embodiments of the present disclosure.

FIG. 23 illustrates a flowchart for an example process for determining an $n_s$ value for CSI-RS sequence generation for CSI-RS detection in accordance with various embodiments of the present disclosure. For example, the process illustrated in FIG. 23 may be implemented by the UE 116. In this illustrative embodiment, the process for determining the $n_s$ value used to generate CSI-RS sequence for DRS of a slot can be the same as that defined for CRS sequence generation as discussed above with regard to FIG. 22. Detection of CSI-RS sequence can be more simplified compared to that of CRS sequence detection because the UE can utilize the $n_s$ value detected for CRS sequence and thus can avoid the need to perform blind detection of the $n_s$ value for CSI-RS detection. For example, UE can perform blind detection of $n_s$ based on CRS first, and then assume the same $n_s$ value for CSI-RS if the CSI-RS is transmitted in the same slot as the detected CRS, or determine the appropriate $n_s$ based on the timing difference between the detected CRS and the CSI-RS to be detected (2360) (e.g., if CSI-RS is to be detected in k slots after the slot of detected CRS sequence, then the $n_s$ value for CSI-RS is given by (CRS's $n_s$+k)mod 20). The UE then applies the determined $n_s$ value in CSI-RS sequence generation for CSI-RS detection (2370).

In another example embodiment, the $n_s$ value used to generate CSI-RS sequence for LAA DRS of any slot is fixed to a constant. For example, $n_s$=0 is always used as the sequence regardless of the slot/subframe index of CSI-RS transmission (this is equivalent to remove the parameter $n_s$ from the formula to determine $c_{init}$). In another example, $n_s$=0 is always used in the first slot and $n_s$=1 is always used in the second slot regardless of the slot/subframe index of CSI-RS transmission. An advantage of this example embodiment is simplification of CSI-RS blind detection as dependency on slot index can be eliminated.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for receiving a discovery reference signal (DRS), the method comprising:
   identifying, based on a DRS measurement timing configuration (DMTC), a DRS detection/measurement gap duration and a periodicity;
   listening for the DRS on a carrier in an unlicensed spectrum during the identified gap duration at the identified periodicity, wherein the DRS is transmitted in at least one of a number of time positions within the identified gap duration subject to application of a listen-before-talk (LBT) protocol;
   identifying a subframe range in which a secondary synchronization signal (SSS) included in the DRS is transmitted;
   identifying a first sequence for the SSS based on the identified subframe range in which the SSS is transmitted belonging to a first set of subframes; and
   identifying a second sequence for the SSS based on the identified subframe range in which the SSS is transmitted not belonging to the first set of subframes.

2. The method of claim 1, further comprising:
   generating common reference signal (CRS) sequences for CRS detection based on slot number values corresponding to the identified subframe range in which the SSS is transmitted; and
   determining a slot number for a CRS included in the DRS based on the CRS detection.

3. The method of claim 2, further comprising generating a channel state information reference signal (CSI-RS) sequences for CSI-RS detection based on the determined slot number for the CRS.

4. The method of claim 1, further comprising:
   detecting a common reference signal (CRS) associated with a cell in the DRS; and
   detecting a downlink transmission in the unlicensed spectrum from the cell based on the detected CRS.

5. The method of claim 4, further comprising receiving the downlink transmission in a first subframe where the CRS is detected.

6. The method of claim 4, wherein, when the DRS detection/measurement gap duration and the downlink transmission overlap, the DRS is transmitted in a first subframe of the DRS detection/measurement gap duration.

7. A user equipment (UE) for receiving a discovery reference signal (DRS), the UE comprising:
   a controller configured to identify, based on a DRS measurement timing configuration (DMTC), a DRS detection/measurement gap duration and a periodicity; and
   a transceiver configured to
      listen for the DRS on a carrier in an unlicensed spectrum during the identified gap duration at the identified periodicity, wherein the DRS is transmitted in at least one of a number of time positions within the identified gap duration subject to application of a listen-before-talk (LBT) protocol, identify a subframe range in which a secondary synchronization signal (SSS) included in the DRS is transmitted, identify a first sequence for the SSS based on the identified subframe range in which the SSS is transmitted belonging to a first set of subframes, and identify a second sequence for the SSS based on the identified subframe range in which the SSS is transmitted not belonging to the first set of subframes.

8. The UE of claim 7, wherein the controller is configured to:

generate common reference signal (CRS) sequences for CRS detection based on slot number values corresponding to the identified subframe range in which the SSS is transmitted; and determine a slot number for a CRS included in the DRS based on the CRS detection.

9. The UE of claim 8, wherein the controller is configured to generate a channel state information reference signal (CSI-RS) sequences for CSI-RS detection based on the determined slot number for the CRS.

10. The UE of claim 7, wherein the controller is configured to:

detect, via the transceiver, a common reference signal (CRS) associated with a cell in the DRS; and detect, via the transceiver, a downlink transmission in the unlicensed spectrum from the cell based on the detected CRS.

11. The UE of claim 10, wherein the transceiver is configured to receive the downlink transmission in a first subframe where the CRS is detected.

12. The UE of claim 10, wherein, when the DRS detection/measurement gap duration and the downlink transmission overlap, the DRS is transmitted in a first subframe of the DRS detection/measurement gap duration.

13. An apparatus for a eNodeB (eNB) associated with a cell, the apparatus comprising:

a controller configured to configure a discovery reference signal (DRS) measurement timing configuration (DMTC) including a DRS detection/measurement gap duration and a periodicity; and a transceiver configured to transmit the DRS on a carrier in an unlicensed spectrum during the gap duration at the periodicity, wherein the DRS is transmitted in at least one of a number of time positions within the identified gap duration subject to application of a listen-before-talk (LBT) protocol, transmit a secondary synchronization signal (SSS) included in the DRS, wherein a first sequence for the SSS is identified based on the identified subframe range in which the SSS is transmitted belonging to a first set of subframes, and wherein a second sequence for the SSS is identified based on the identified subframe range in which the SSS is transmitted not belonging to the first set of subframes.

14. The apparatus of claim 13, wherein the transceiver is configured to:

transmit a common reference signal (CRS) associated with the cell in the DRS; and transmit a downlink transmission in the unlicensed spectrum based on the transmitted CRS.

15. The apparatus of claim 14, wherein the transceiver is configured to transmit the downlink transmission in a first subframe where the CRS is transmitted.

* * * * *